US 10,728,213 B2

(12) United States Patent
Jha

(10) Patent No.: US 10,728,213 B2
(45) Date of Patent: Jul. 28, 2020

(54) COMMUNICATION SYSTEM

(75) Inventor: Vivek Jha, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 573 days.

(21) Appl. No.: 14/238,452

(22) PCT Filed: Jul. 17, 2012

(86) PCT No.: PCT/JP2012/068545
§ 371 (c)(1),
(2), (4) Date: Feb. 11, 2014

(87) PCT Pub. No.: WO2013/024666
PCT Pub. Date: Feb. 21, 2013

(65) Prior Publication Data
US 2014/0195655 A1  Jul. 10, 2014

(30) Foreign Application Priority Data

Aug. 12, 2011 (GB) .................................. 1113942.5

(51) Int. Cl.
G06F 15/177 (2006.01)
H04L 29/12 (2006.01)
(52) U.S. Cl.
CPC ...... H04L 61/2503 (2013.01); H04L 61/2575 (2013.01); H04L 61/2592 (2013.01)
(58) Field of Classification Search
None
See application file for complete search history.

(56) References Cited

U.S. PATENT DOCUMENTS

| 6,311,055 | B1* | 10/2001 | Boltz ................. H04M 1/66 379/196 |
| 7,020,720 | B1 | 3/2006 | Donahue et al. |
| 2003/0112793 | A1 | 6/2003 | Sengodan |
| 2003/0212795 | A1 | 11/2003 | Harris et al. |
| 2007/0195800 | A1 | 8/2007 | Yang et al. |

(Continued)

FOREIGN PATENT DOCUMENTS

| CN | 1586065 A | 2/2005 |
| CN | 101385315 A | 3/2009 |

(Continued)

OTHER PUBLICATIONS

IP Flow Information Export (IPFIX) Information Elements, Internet Assigned Numbers Authority, created Feb. 10, 2007, Last Updated Dec. 17, 2008, Internet Archive date Feb. 7, 2009, https://web.archive.org/web/20090207020523/https://www.iana.org/assignments/ipfix/ipfix.xhtml).*

(Continued)

Primary Examiner — Brian Whipple
Assistant Examiner — Gregory P Tolchinsky
(74) Attorney, Agent, or Firm — Sughrue Mion, PLLC

(57) ABSTRACT

A communication system is described in which a NATed IP address of a home base station is communicated to the home base station by a home base station gateway or a mobility management entity. In one embodiment, the gateway or the mobility management entity receives the NATed IP address from a security gateway that is used to establish a secure tunnel with the home base station through an IP network.

4 Claims, 14 Drawing Sheets

(56) References Cited

U.S. PATENT DOCUMENTS

| | | | |
|---|---|---|---|
| 2008/0267114 A1* | 10/2008 | Mukherjee | H04L 63/107 370/315 |
| 2011/0111767 A1* | 5/2011 | Livanos | H04W 28/16 455/452.2 |
| 2011/0223919 A1* | 9/2011 | Vikberg | H04W 36/08 455/436 |
| 2011/0235595 A1 | 9/2011 | Mehta et al. | |
| 2012/0163293 A1* | 6/2012 | Mildh | H04W 12/08 370/328 |
| 2012/0214445 A1* | 8/2012 | Stojanovski | H04L 63/164 455/411 |
| 2012/0281707 A1* | 11/2012 | Muhanna | H04L 61/2575 370/401 |
| 2013/0005328 A1 | 1/2013 | De Benedittis et al. | |

FOREIGN PATENT DOCUMENTS

| | | |
|---|---|---|
| CN | 101605154 A | 12/2009 |
| CN | 101640876 A | 2/2010 |
| CN | 101729337 A | 6/2010 |
| CN | 101730268 A | 6/2010 |
| EP | 1 786 222 A1 | 5/2007 |
| JP | 2010-087612 A | 4/2010 |
| JP | 2010-154097 A | 7/2010 |
| JP | 2010283763 A | 12/2010 |

OTHER PUBLICATIONS

3rd Generation Partnership Project; Technical Specification Group Radio Access Network; UTRAN Iuh interface Home Node B (HNB) Application Part (HNBAP) signalling. 3GPP TS 25.469 V10.1.0 (Jun. 2011).*
International Search Report in PCT/JP2012/068545 dated Nov. 13, 2012 (English Translation Thereof).
3GPP TS 33.320 V11.2.0 (Jun. 2011) 3$^{rd}$ Generation Partnership Project; Technical Specification Group Services and System Aspects; Security of Home Node B (HNB)/Home evolved Node B (HeNB) (Release 11).
3GPP TS 23.402 V10.4.0 (Jun. 2011) 3$^{rd}$ Generation Partnership Project; Technical Specification Group Services and System Aspects; Architecture enhancements for non-3GPP accesses (Release 10).
3GPP TS 25.469 V10.1.0 (Jun. 2011) 3$^{rd}$ Generation Partnership Project; Technical Specification Group Radio Access Network; UTRAN Iuh interface Home Node B (HNB) Application Part (HNBAP) signaling (Release 10).
3GPP TS 25.468 V10.1.0 (Jun. 2011) 3$^{rd}$ Generation Partnership Project; Technical Specification Group Radio Access Network; UTRAN Iuh Interface RANAP User Adaption (RUA) signalling (Release 10).
3GPP TS 36.413 V10.2.0 (Jun. 2011) 3$^{rd}$ Generation Partnership Project; Technical Specification Group Radio Access Network; Evolved Universal Terrestrial Radio Access Network (E-UTRAN); S1 Application Protocol (S1AP) (Release 10).
3GPP TS 23.203 V11.2.0 (Jun. 2011) 3$^{rd}$ Generation Partnership Project; Technical Specification Group Services and System Aspects; Policy and charging control architecture (Release 11).
3 TS 23.060 V10.4.0 (Jun. 2011) 3$^{rd}$ Generation Partnership Project; Technical Specification Group Services and System Aspects; General Packet Radio Service (GPRS); Service description; Stage 2 (Release 10).
3GPP TS 25.467 V10.2.0 (Jun. 2011) 3$^{rd}$ Generation Partnership Project; Technical Specification Group Radio Access Network; UTRAN architecture for 3G Home Node B (HNB); Stage 2 (Release 10).
3GPP TS 22.220 V10.7.0 (Jun. 2011) 3$^{rd}$ Generation Partnership Project; Technical Specification Group Services and System Aspects; Service requirements for Home Node B (HNB) and Home eNode B (HeNB) (Release 10).
T. Kivinen, et al., "Negotiation of NAT-Traversal in the IKE", Network Working Group, Cisco Systems Jan. 2005.
Japanese Office Action dated Dec. 10, 2014 with a partial English Translation.
ZTE, "H(e)NB's NATed Tunnel-IP and port-id Resolution" [online], 3GPP TSG-SA WG2#86, S2-113562, Internet URL:http://www.3gpp.org/ftp/tsg_sa/WG2_Arch/TSGS2_86._Naantali/Docs/S2-113562.zip, Jul. 15, 2011.
Huawei, Hisilicon, "TS 23. 139: Procedure for HNB CS service in Roaming case" [online], 3GPP TSG-SA WG2#86, S2-113286, internet URL:http:www.3gpp.org/ftp/tsg_sa/WG2_Arch/TSGS2_86_.Naamtali/Docs/S2-113286.zip, Jul. 15, 2011.
Japanese Office Action dated Jul. 8, 2015.
TD S2-113073, ZTE, "Normative work on Procedures for Fixed Broadband Access network using HNB- for PS services—PDP Context Activation" 3GPP TSG SA WG2 Meeting #86, Naantali, Finland, Jul. 11-15, 2011.
Communication dated Aug. 24, 2016, issued by the Japan Patent Office in corresponding Japanese Application No. 2015-212570.
SA2, "LS on Signalling of tunnel information for BBF access [online]", 3GPP TSG-SA WG2 Meeting #85, Xi'an, P.R. China, May 16-20, 2011, S2-112880 (1 page total).
Airvana, Alu, Ericsson, IP Access, NSN, Samsung, Thomson, "RUA SCCP Interaction [online]", 3GPP TSG RAN WG3 meeting HNB adhoc, Vienna, Austria; Oct. 21, 22, 2008, R3-082885 (3 pages total).
ZTE, "3G HNB BBAI support for PS service [online]", 3GPP TSG SA WG2 Meeting #85, May 16-20, 2011, Xi'An, China, TD S2-112356 (7 pages total).
Chinese Office Action dated May 3, 2016 with an English translation.

\* cited by examiner

COMMUNICATION SYSTEM

TECHNICAL FIELD

The present invention relates to mobile telecommunication networks and to parts thereof, particularly but not exclusively networks operating according to the 3$^{rd}$ Generation Partnership Project (3GPP) standards or equivalents or derivatives thereof. The invention has particular although not exclusive relevance to the interworking between the core mobile telecommunication network and a broadband access network.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the (Long Term Evolution) LTE standards, the HNB is sometimes referred to as an HeNB. A similar architecture will also be applied in the WiMAX network. In this case, the home base station is commonly referred to as a femto cell. For simplicity, the present application will use the term HNB to refer to any such home base station and will use the term NodeB generically to refer to other base stations (such as the base station for the macro cell in which a HNB operates). The HNB will provide radio coverage (for example, 3G/4G/WiMAX) within the home, small and medium enterprise, shopping Malls etc and will typically connect to the core network via a suitable residential gateway and public or corporate broadband access network (for example via an ADSL link to the Internet).

SUMMARY OF INVENTION

Technical Problem

When an HNB is powered up, it will be given an IP address by the local network to which it is connected and the HNB will provide this IP address to the mobile telephone operator network so that it can reserve appropriate resources for the HNB through the broadband access network. However, very often the IP path between the HNB and the mobile telephone core network will include one or more Network Address Translation (NAT) devices that change the local IP address and a local UDP port into a "public" IP address and a public UDP port. The HNB does not normally know what changes the NAT device(s) make and so it cannot provide this information to the mobile telephone core network.

Solution to Problem

Aspects of the present invention address this problem and provide mechanisms that allow the HNB to obtain this so called "NATed" address information and that allow the HNB to provide the information to the relevant nodes within the mobile telephone core network during different operating scenarios, such as circuit switched (CS) or Packet Switched (PS) setup procedures.

Although for efficiency of understanding for those of skill in the art, the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

According to one aspect, the invention provides a security gateway for coupling a base station device with a core network of a communication network through an IP network, the security gateway comprising: a first interface for coupling to the base station device through the IP network; a second interface for coupling to a node within the core network; an analysis module for analysing packets received from the base station device over the first interface to determine a Network Address Translated, NATed, IP address for the base station; and a communication module for communicating the determined NATed IP address for the base station device to said node within the core network over said second interface.

The analysis module may be arranged to analyse the packets received from the base station device over the first interface to determine a NATed port number for the base station and the communication module may be arranged to communicate said NATed port number to said node within the core network. The communication module may be arranged to communicate said NATed IP address to a base station gateway or a mobility management entity within the core network.

The analysis module may monitor packets arriving from said base station device to detect a change in the NATed IP address of the base station device and the communication module may communicate the change in the NATed IP address to said node within the core network.

A security module may also be provided for establishing a secure connection with the base station through said IP network.

The invention also provides a communication node arranged to communicate with a base station device via an IP network and a security gateway, the communication node comprising: a security gateway communication module arranged to communicate with the security gateway and to receive a Network Address Translated, NATed, IP address for the base station from the security gateway; and a base station communication module arranged to communicate with the base station via said security gateway and the IP network and arranged to send the NATed IP address for the base station to the base station.

The security gateway communication module may receive a NATed port number for the base station device and the second communication module may communicate the NATed port number to the base station.

The base station communication module may send the NATed address to the base station device during a registration procedure when the base station is registering with the communication node. The base station communication module may also receive a message from the base station device that includes the NATed IP address of the base station device and may further comprise a policy control node communication module for communicating the NATed IP address received from the base station device with a policy control node that uses the NATed IP address to locate the correct base station and secure resources through the IP network for the base station device.

The base station communication module may receive a message from the base station device that includes a NATed IP port number of the base station device and the policy control node communication module may communicate the NATed IP port number received from the base station device with said policy control node that uses the NATed IP port number to locate the correct base station and secure resources through the IP network for the base station device.

The base station communication module may receive a message from the base station device that includes a Fully Qualified Domain Name, FQDN, associated with a part of the IP network to which the base station device is coupled and the policy control node communication module may communicate the FQDN received from the base station device with said policy control node that uses the FQDN to locate the correct base station and secure resources through the IP network for the base station device. The message may be a connect message for establishing a new service for a user equipment associated with the base station device.

The invention also provides a communication node arranged to communicate with a base station device via an IP network, the communication node comprising: a base station communication module arranged to communicate with the base station via said IP network, wherein the base station communication module is arranged to receive an HNBAP or RUA message from the base station device that includes a NATed IP address for the base station; and a policy control node communication module for communicating the NATed IP address received from the base station device with a policy control node that uses the NATed IP address to secure resources through the IP network for the base station device.

The base station communication module may receive said NATed IP address in an HNBAP Register Request message or an HNBAP Configuration Update message or an RUA connectionless transfer.

The communication node described above may be a base station gateway device or a Mobility Management Entity, MME.

The base station communication module may receive a bearer admission request message and wherein a policy control node communication module may send a policy control node a message requesting modification of resources secured for the base station device through the IP network. The bearer admission request message comprises Radio Access Bearer, RAB, parameters for a new service and the message requesting modification may be for securing resources through said IP network in accordance with the RAB parameters.

The policy control node communication module may receive a message from the policy control node confirming whether or not the requested modification of resources secured for the base station has been successful and the base station communication module may send the base station bearer admission response message indicating whether or not the resources have been secured through the IP network.

The base station communication module may receive a message from the base station device that includes the NATed IP address of the base station device and further comprising a further communication module for communicating the NATed IP address received from the base station device with another node within a core network. The another node may be one of: a Serving GPRS Support Node, SGSN, a mobile switching centre, MSC, and a Mobility Management Entity, MME.

The invention also provides a base station device comprising: an IP network interface for coupling to an IP network; one or more antennae for communicating with one or more user devices over a wireless interface; a communication module for communicating with one or more nodes within a core network over said IP network interface; and wherein the communication module is arranged to communicate a NATed IP address associated with the base station with a base station gateway node or a mobility management entity within the core network over said IP network interface.

The communication module may receive said NATed IP address associated with the base station in an HNBAP message or a SLAP message from said base station gateway node or mobility management entity within the core network.

The communication module may register the base station device with a base station gateway within the core network and may receive the NATed IP address in an HNBAP message from the base station gateway.

The communication module may also send a setup message to a base station gateway or a mobility management entity within the core network and may receive the NATed IP address in a setup response message from the base station gateway or the mobility management entity.

The communicating module may transmit said NATed IP address associated with the base station in an HNBAP, RUA message or a S1AP message to said base station gateway or mobility management entity within the core network.

The communication module may transmit a connect request or direct transfer message to the core network in respect of a new service requested by a user device served by the base station, which connect request or direct transfer message includes the NATed IP address associated with the base station. The connect request or direct transfer message further comprises a NATed port number associated with the base station. The connect request or direct transfer message may further comprise a Fully Qualified Domain Name, FQDN associated with a part of the IP network to which the base station device is connected.

The communication module may receive a Radio Access Bearer, RAB assignment request from a node within the core network via said IP network interface and, in response, may send a bearer admission request message to a base station gateway or a mobility management entity within the core network via said IP network interface, which bearer admission request message includes RAB parameters associated with a service requested by a user device served by the base station device.

The communication module may receive a bearer admission response message from said base station gateway or the mobility management entity indicating whether or not resources for the service requested by the user device have been secured through the IP network.

The invention also provides a security gateway for coupling a base station device with a core network of a communication network through an IP network, the security gateway comprising: means for coupling to the base station device through the IP network; means for coupling to a node within the core network; means for analysing packets received from the base station device to determine a Network Address Translated, NATed, IP address for the base station; and means for communicating the determined NATed IP address for the base station device to said node within the core network.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings in which.

DESCRIPTION OF EMBODIMENTS

Overview

Figure 1:
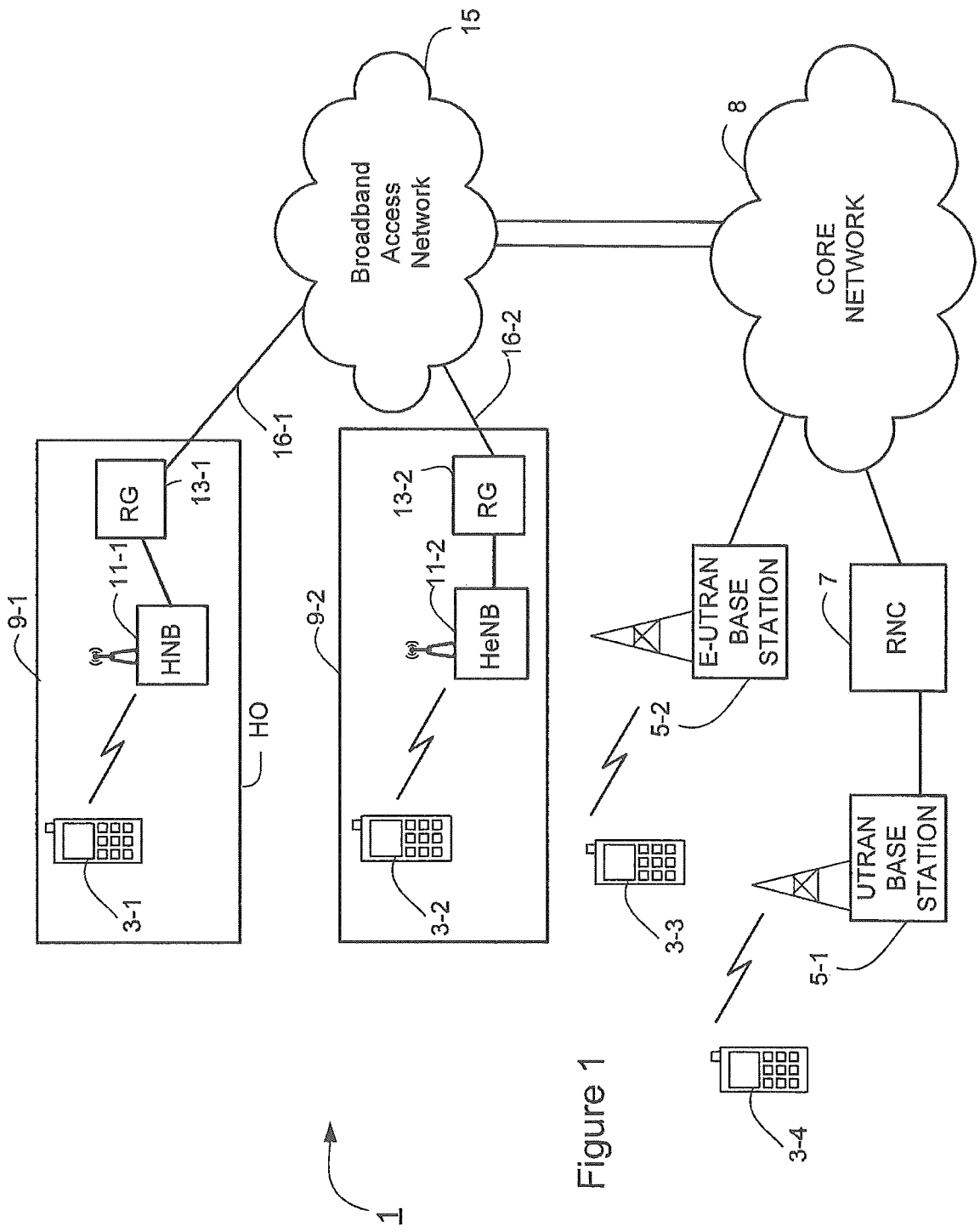
FIG. 1 schematically illustrates a mobile telecommunication system.

FIG. 1 schematically illustrates a mobile (cellular) telecommunication system 1 in which users of mobile telephones 3-1 to 3-4 can communicate with other users via different access nodes. In particular, mobile telephones 3 (or other user equipment) can make connections with the mobile telephone core network 8 directly via a Universal Terrestrial Radio Access Network (UTRAN) base station 5-1 and associated Radio Network Controller (RNC) 7 or an evolved UTRAN (E-UTRAN) base station 5-2. Mobile telephones 3 can also connect to the mobile telephone core network 8 using a 'home' base station (HNB) provided in a user's commercial or private residence 9. The HNB 11 is coupled by a residential gateway 13 and a broadband access network 15 (conforming to the BroadBand Forum, BBF), to the mobile telephone core telephone network 8. In the example illustrated in FIG. 1, mobile telephone 3-1 is connected to the core network 8 via the HNB 11-1; the mobile telephone 3-2 is connected to the core network 8 via HeNB 11-2; mobile telephone 3-3 is connected to the core network 8 via E-UTRAN base station 5-2; and mobile telephone 3-4 is connected to the core network 8 via UTRAN base station 5-1.

In the example of FIG. 1, the residential gateways 13 connect to the broadband access network 15 via a suitable Internet connection such as an ADSL or cable connection 16 and the HNBs are programmed with the IP address of a security gateway (not shown) within the core network 8 so that, when powered up, the HNBs initially connect to the pre-programmed security gateway. In this embodiment, the residential gateway 13 or a device in the broadband access network 15 assigns the HNB 11 with a local IP address that the HNB 11 will use in its communications with the core network 8. As those skilled in the art will appreciate, it is common to hide an entire IP address space (such as the local IP addresses assigned to devices on a local network) behind a single IP address (or in some cases a small group of IP addresses) in another (usually public) address space. To avoid ambiguity in the handling of returned packets, a one-to-many Network Address Translation (NAT) or a Network Address and Port Translation (NAPT) must alter higher level information such as TCP/UDP ports in outgoing communications and must maintain a translation table so that return packets can be correctly translated back. This NAT/NAPT may be performed by the residential gateway 13 and/or devices in the broadband access network 15.

This NAT/NAPT function can cause problems for the operation of the HNB 11 and in particular in the proper interoperability between the telephone core network 8 and the broadband access network 15. In particular, when an HNB 11 powers up and connects to the core network 8, it will provide its assigned IP address to the core network 8. However, if one or more NAT/NAPT devices are located in the path between the HNB 11 and the core network 8, then the IP address provided by the HNB 11 cannot be used by the core network 8 to interoperate with the broadband access network 15 to ensure that the required resources through the broadband network 15 are made available for the HNB 11. The applicant has devised a way to provide this information to the HNB 11 and supplemental to this has devised a number of techniques for the HNB 11 to provide this information to the relevant nodes within the core network 8 when establishing a service for a mobile telephone 3 or similar user equipment.

3GPP—Broadband Access Network Interworking

Figure 2:
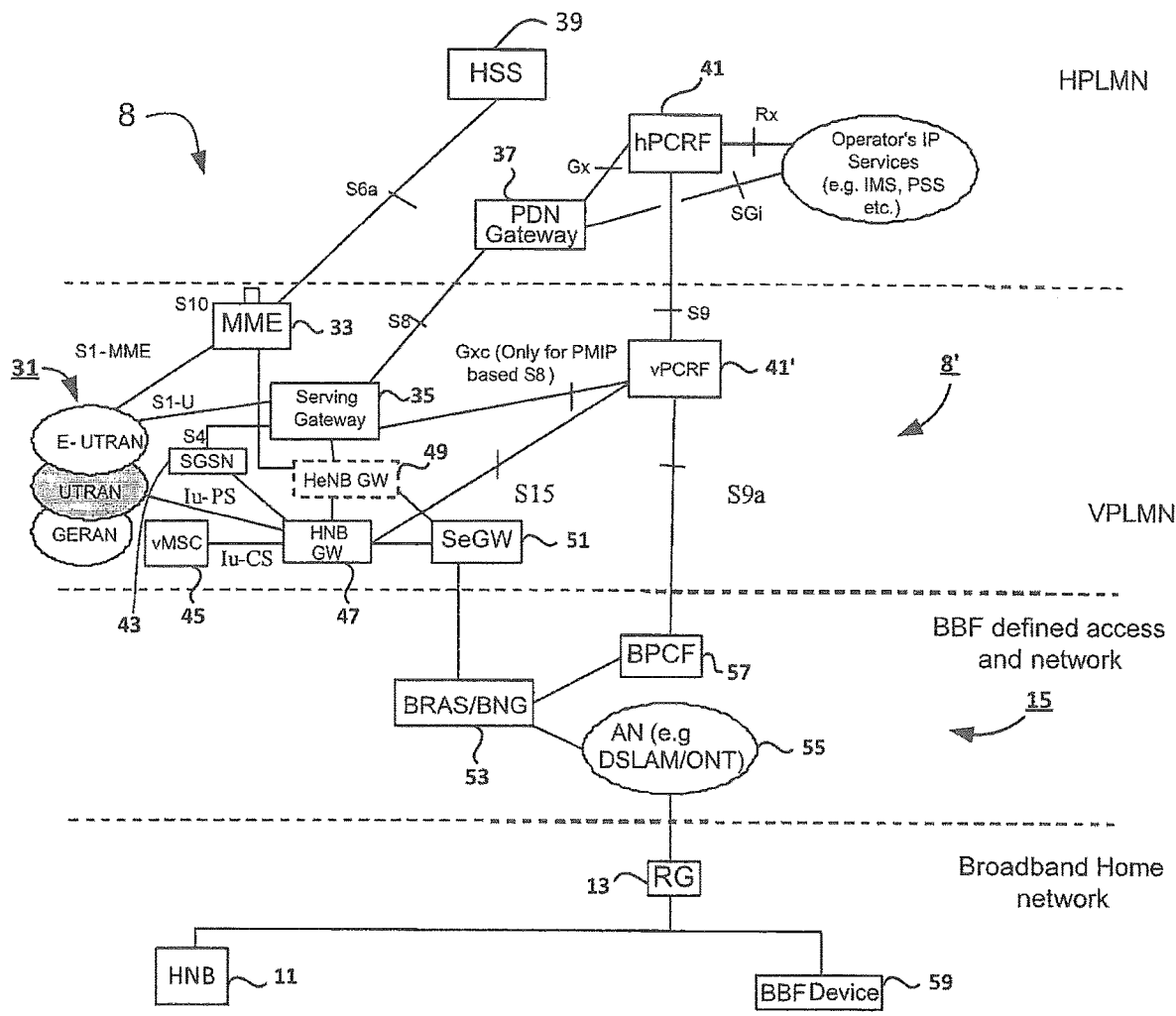
FIG. 2 is a schematic block diagram illustrating the interfaces established between nodes within a mobile telephone core network forming part of the system shown in FIG. 1 and nodes of a broadband access network forming part of the system shown in FIG. 1.

FIG. 2 is a block diagram illustrating the network architecture for the "roaming" situation—where a user equipment 3 is connected via a visited mobile telephone network 8'. As shown, the visited core network 8' includes the radio access network 31 which may be E-UTRAN, UTRAN or GERAN and which includes the above described base stations 5 and RNCs 7. In the case of an E-UTRAN base station 5-2, it is connected to a Mobility Management Entity (MME) 33 which is the key control node for the E-UTRAN access network; and a serving gateway 35 which routes and forwards user data packets. The other important network nodes for the present discussion include the PDN gateway 37 (located within the home core network 8) that provides connectivity for the user equipment 3 to external packet data networks; the Home Subscriber Server (HSS) 39 (also located within the home core network 8) that is a central database of user related and subscription related information; and Policy Charging Rules Function (PCRF) nodes 41 which make policy decisions for each subscriber relating to, for example, Quality of Service (QoS) and charging rules. As shown in FIG. 2, there is a home hPCRF 41 in the home core network 8 and a visited vPCRF 41' in the visited core network 8'.

In respect of the UTRAN access network, the main nodes in the core network 8 include the Serving GPRS Support Node (SGSN) 43 which is responsible for the delivery of data packets to and from the user equipment 3; the visited Mobile Switching Centre (vMSC) 45 which is responsible for routing voice calls and other services to the user equipment 3; the serving gateway 35, the PDN gateway 37 and the home hPCRF 41 and visited vPCRF 41'. The UTRAN network nodes also include an HNB gateway (HNB-GW) 47 which aggregates traffic from a large number of HNBs 11 to the vMSC 45. A similar HeNB-GW 49 can optionally be provided in the E-UTRAN side of the core network 8. As shown in FIG. 2, the core network 8 also includes a security gateway SeGW 51 that is responsible for establishing secure IPSec tunnels with all HNBs 11 through which voice, messaging and packet data services between the HNB 11 and the core network 8 are delivered.

As shown in FIG. 2, the broadband access network 15 has a Broadband Remote Access Server (BRAS)/Broadband Network gateway (BNG) 53 that connects to the SeGW 51. This node is connected to the residential gateway 13 via an Access Network 55, such as a DSLAM/ONT network. The operation of the BRAS/BNG node 53 in respect of charging and QoS etc is controlled by a Broadband Policy Control Function (BPCF) 57, which inter-operates with the PCRF 41 (home or visited) in the mobile telephone core network 8 to reserve resources through the broadband access network for the HNBs 11. As shown, the residential or commercial premise 9 includes the residential gateway 13 and the HNBs 11. Other BBF broadband access devices 59, such as access points, routers and the like, may also be provided in the residential/commercial premises 9.

As those skilled in the art will appreciate, the network architecture shown in FIG. 2 is for the more complicated "Roaming" situation—where a user equipment is connected to the network via a visited core network 8'. A simpler architecture exists when the UE is not roaming. In this case, there is no visited core network 8' and the home hPCRF 41 is connected to the BPCF 57 directly rather than through the visited vPCRF 41'. To facilitate the explanation of the different aspects of the invention, in the discussion below, reference will not be made as to whether the core network nodes are in a home core network 8 or in a visited core network 8'.

HNB Power up Procedure

Figure 3:
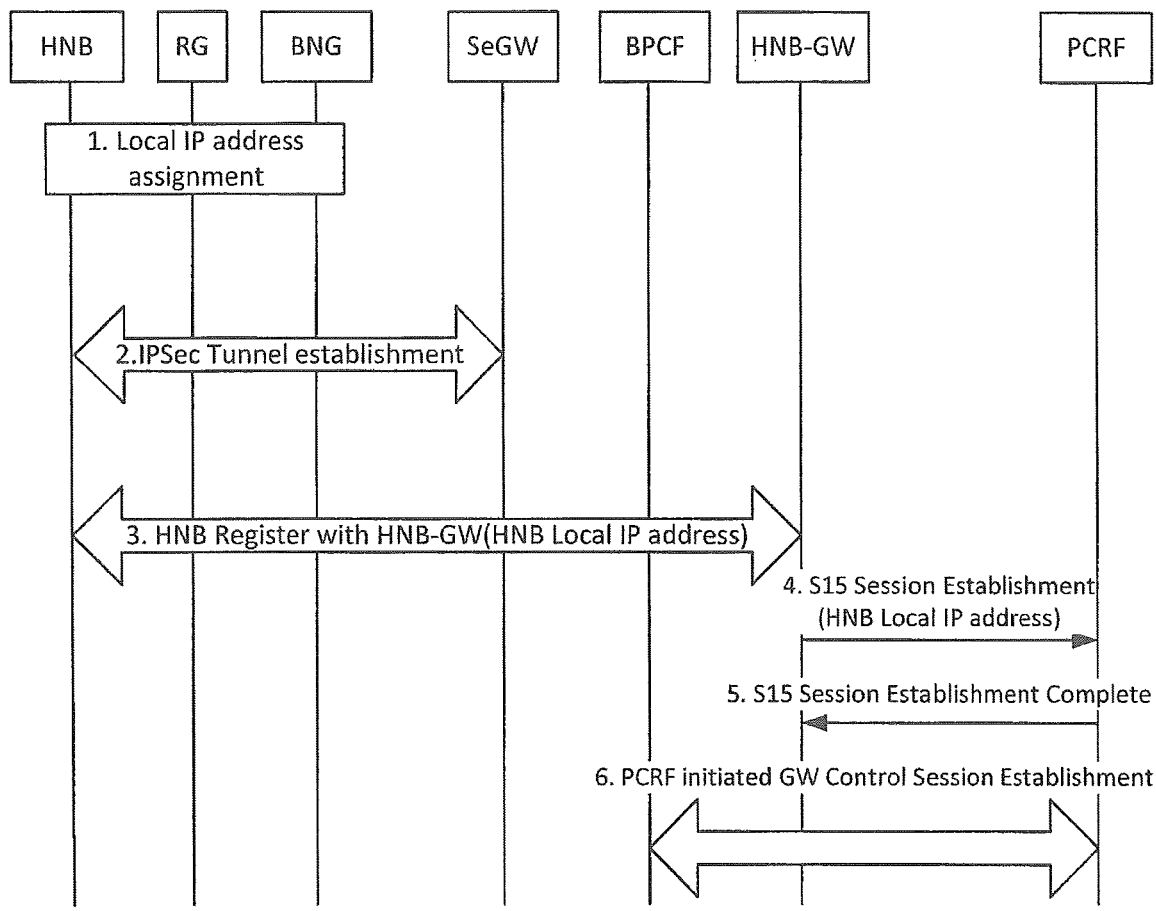
FIG. 3 is a timing diagram illustrating a general registration procedure carried out by a home base station (HNB) forming part of the system shown in FIG. 1 at the time of power up.

FIG. 3 illustrates what happens when a UTRAN HNB 11 is powered up. As shown, at step 1, the HNB 11 is assigned an IP address, in this case by a device within the broadband access network 15, such as the Broadband Network Gateway (BNG) 53. Then in step 2, the HNB 11 establishes a secure IPSec Tunnel (in the manner explained in TS 33.320 v11.2.0, the content of which is incorporated herein by reference) with the SeGW 51 to establish a secure tunnel between the HNB 11 and the SeGW 51. The HNB 11 then registers itself with the HNB-GW 47 in step 3. During this registration process, the HNB 11 informs the HNB-GW 47 of its local IP address or if NAT/NAPT is detected, its NATed IP tunnel address, any NATed UDP ports and the Fully Qualified Domain Name (FQDN) of the broadband access network (received from the HMS). In step 4, the HNB-GW 47 establishes a "S15 session" with the PCRF 41 and provides the PCRF 41 with the information about the HNB's local IP address (or NATed IP tunnel address and NATed UDP ports if NAT/NAPT is detected) and/or the FQDN of the broadband access network. This S15 session supports the initiation, modification and termination of sessions between the HNB GW 47 and the PCRF 41' to support Circuit Switched (CS) sessions (e.g. voice call services). Once the S15 session has been established the PCRF 41 informs the HNB-GW 47 in step 5 and then initiates, in step 6, a gateway control session to establish an "S9* session" with the Broadband Policy Control Function (BPCF) 57 (if the PRCF is a home PCRF 41 or an "S9a session" if the PCRF is a visited PCRF 41'). This S9*/S9a session allows for the transfer of dynamic QoS control policies from the PCRF 41 in order to provide the interworking between the PCRF 41 and the BPCF 57. During the establishment of the S9*/S9a session, the PCRF 41 sends the BPCF 57 the HNB local IP address (or the NATed HNB IP address and NATed UDP port if NAT/NAPT is detected) and FQDN so that BPCF can locate the right HNB and resources within the broadband access network 15 for the HNB 11 can be set aside. Further details of the interfaces illustrated in FIG. 2 can be found in 3GPP Technical Specification TS 23.402 v10.4.0, the content of which is incorporated herein by reference.

Therefore, as can be seen from the above, in order for the HNB-GW 47 to be able to establish the S15 session with the PCRF 41, it needs to have:

1) the HNB NATed tunnel IP address;
2) the HNB NATed UDP port(s); and
3) the FQDN of the broadband access network to which the HNB is connected.

Currently it is assumed that the HNB 11 can discover whether there are any NAT/NAPT devices in the IP path between the HNB 11 and the SeGW 51. However, the HNB 11 does not know the actual HNB's NATed tunnel IP address allocated by the NAT device to the HNB 11. Normally the NAT/NAPT device allocates the same global IP address to the many HNBs 11 connected behind the broadband access network device. This is similarly true with regard to the UDP port(s) which may also be changed by the NAT/NAPT device.

Several options have already been suggested for how the HNB 11 can discover the HNB's NATed tunnel IP address and UDP port, although these options have been proposed for a different reason—namely to allow the MME 33 or the SGSN 43 to establish a Packet Switched (PS) session for a user equipment connecting via the HNB 11. These options can also be used to provide the HNB 11 with this information for the present purposes (to establish the S15 session between the HNB-GW 47 and the PCRF 41), and include:

Option 1: Extending the IETF protocol IKEv2 (RFC 5996) used for establishing the IPSec Tunnel with the SeGW 51. For this option, there are two proposals suggested—(a) extend the IKEv2 TS (Traffic selector) or (b) IKEv2

(Configuration Payload) to have the receiver (i.e. the SeGW 51) to insert the NATed source IP address of the IKEv2/IPSec tunnel and send it back to the HNB 11. However, this will impact both HNB 11 and the SeGW 51 and will require significant work in the IETF and is therefore not favoured.

Option 2: Use STUN Protocol (RFC 5389): Implementing the STUN Protocol (RFC 5389) client-server function at the HNB 11 and the SeGW 51 respectively to allow the HNB 11 (acting as STUN client) to inquire its NATed source IP address from the SeGW 51 (acting as STUN sever). The STUN server may either need to be a separate entity or incorporated in the SeGW 51. However, this will also have significant impacts and may require some work in IETF if the SeGW 51 has to work as a STUN server.

Option 3: (3GPP based solution): Define a new interface between the SeGW 51 and the HNB management entity (the HMS, not shown). Whenever a new NATed HNB IP tunnel address/port is assigned the SeGW 51 will be informed due to the establishment of the IPSec tunnel so it can inform the HMS, which can subsequently inform the HNB 11. Alternatively, the NATed IP address and port number may be pre-configured in the HMS, which can then provide this information to the HNB 11. In this case, the broadband access network has to ensure that any NAT device assigns the preconfigured IP address and port number for the H(e)NB in accordance with the information stored in the H(e)MS.

Figure 4A:
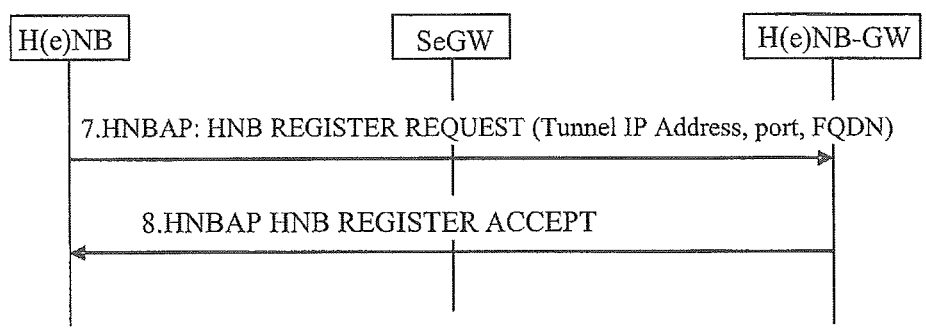
FIG. 4a is a timing diagram illustrating a registration message that can be transmitted from the HNB to an HNB-GW forming part of the core network shown in FIG. 2.
Figure 4B:
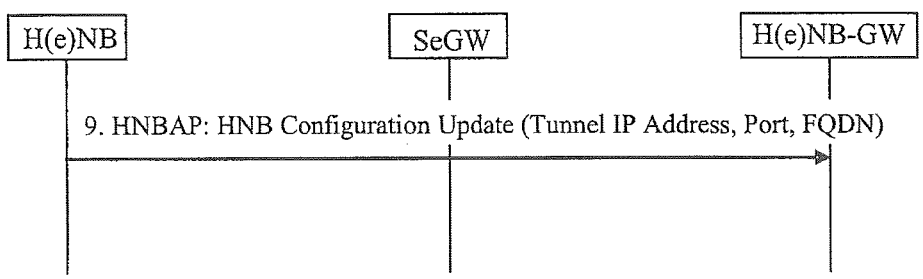
FIG. 4b is a timing diagram illustrating a configuration update message that can be transmitted from the HNB to an HNB-GW forming part of the core network shown in FIG. 2.

Irrespective of which option is selected, a new mechanism is required for HNBAP/RUA to signal the NATed HNB IP tunnel address/port, and FQDN (configured via the HMS) to the HNB-GW 47 from the BNB 11. HNBAP/RUA is the defined protocol for messages transmitted between the HNB 11 and the HNB-GW 47 and terminating at those devices (rather than simply passing through them). Potential candidate HNBAP messages include the HNB REGISTER REQUEST and HNB CONFIGURATION UPDATE messages. These candidate messages are illustrated in FIGS. 4a and 4b. The HNB 11 would use the HNB REGISTER REQUEST message to signal the NATed HNB IP tunnel address/port and FQDN information when the HNB 11 is powering up and registering with the HNB-GW 47. The HNB 11 would use the HNB CONFIGURATION UPDATE message to signal the NATed HNB IP tunnel address/port and FQDN information when a new NATed HNB IP tunnel address/port is assigned to the HNB 11 by the broadband access network 15.

As a further new $4^{th}$ option (instead of options 1 to 3 above), the inventor proposes that if the SeGW 51 and the HNB-GW 47 are collocated or if there is a standardised interface between them, then the SeGW 51 can provide the HNB-GW 47 with the NATed HNB IP tunnel address/port number. Afterwards the HNB-GW 47 can then signal this NATed HNB IP tunnel address/port number to the HNB 11 in an HNBAP/RUA message. As those skilled in the art will be aware, HNBAP messages and RUA messages are used for communications that terminate at the HNB 11 and the HNB-GW. The HNBAP protocol is defined in 3GPP Technical Specification TS 25.469 v10.1.0 and the RUA protocol is specified in the 3GPP Technical Specification TS 25.468 v10.1.0, the content of which is incorporated herein by reference.

Figure 5A:
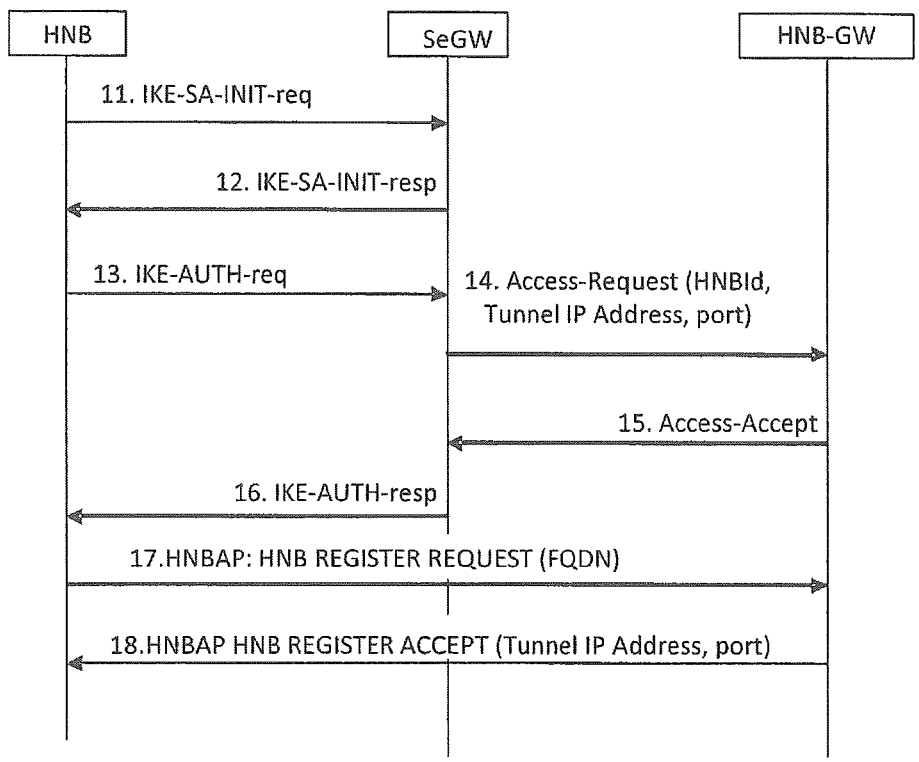
FIG. 5a is a timing diagram illustrating a modified IP security tunnel establishment procedure that can be used in the registration procedure illustrated in FIG. 3 for a UTRAN HNB.

FIG. 5a is a timing diagram illustrating in more detail the way in which the SeGW 51 can provide the HNB NATed IP tunnel address and port information to the HNB-GW 47 and how the HNB-GW 47 can subsequently provide this information to the HNB 11. As shown, in this embodiment, the SeGW 51 provides the HNB NATed IP tunnel address and port information to the HNB-GW 47 during the IPSec tunnel establishment procedure; and the HNB-GW 47 provides this information to the HNB 11 during the HNB registration procedure. In particular, in step 11, the HNB 11 initiates the establishment of the IPSec tunnel with the SeGW 51 by sending the SeGW 51 an IKE-SA-INIT-req; and in step 12 the SeGW 51 responds with an IKE-SA-INIT-resp message. As the SeGW 51 is receiving IP packets from the HNB 11, these packets will include the HNB's NATed IP tunnel address and port number in the source address of the received packets. The SeGW 51 can therefore extract this NATed address and port information and provide it to the HNB-GW 47 in a suitable message.

Figure 5B:
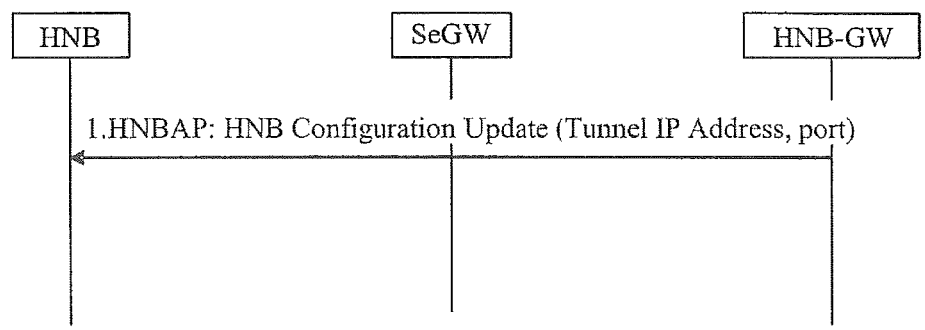
FIG. 5b illustrates a Configuration Update message sent from an HNB-GW to the UTRAN HNB forming part of the system shown in FIG. 1.

As shown in FIG. 5a, after the SeGW 51 has sent the HNB 11 the response message in step 12, the HNB 11 responds by sending the SeGW 51 an IKE-AUTH-req to the SeGW 51 in step 13. This request requires the SeGW to send an Access-Request message in step 14 to the HNB-GW 47. As shown in FIG. 5a, in this embodiment, the SeGW uses this message to send the HNB-GW 47 the HNB's NATed IP tunnel address and port number. The HNB-GW 47 responds, in step 15, with an Access-Accept message which it sends back to the SeGW 51 (if the HNB 11 is authenticated—otherwise the HNB-GW 47 sends an Access-Failure message). In step 16, the SeGW 51 completes the IPSec establishment procedure by sending the IKE-Auth-resp message back to the HNB 11. The HNB 11 may then initiate its HNB registration procedure with the HNB-GW 47 by sending, in step 17, the HNB REGISTER REQUEST message to the BNB-GW 47. As shown in FIG. 5a, in this embodiment, this message includes the FQDN of the broadband access network to which the HNB 11 is connected. The HNB 11 obtains this information from the HNB management entity (HMS). In response to receiving this register request message, the HNB-GW 47 returns, in step 18, the HNB REGISTER ACCEPT message to the HNB 11. As shown in FIG. 5a, this returned accept message includes the NATed IP tunnel address and UDP port for the HNB 11 (that the HNB-GW 47 received from the SeGW 51 in step 14). Any subsequent changes to the NATed IP address or port number signalled to the HNB-GW 47 (for example by the SeGW 51) can then be signalled to the HNB 11 in an HNBAP/RUA message. For example, the updated information may be transmitted in an HNB Configuration Update message transmitted from the HNB-GW 47 to the HNB 11, as shown in FIG. 5b.

Figure 5C:
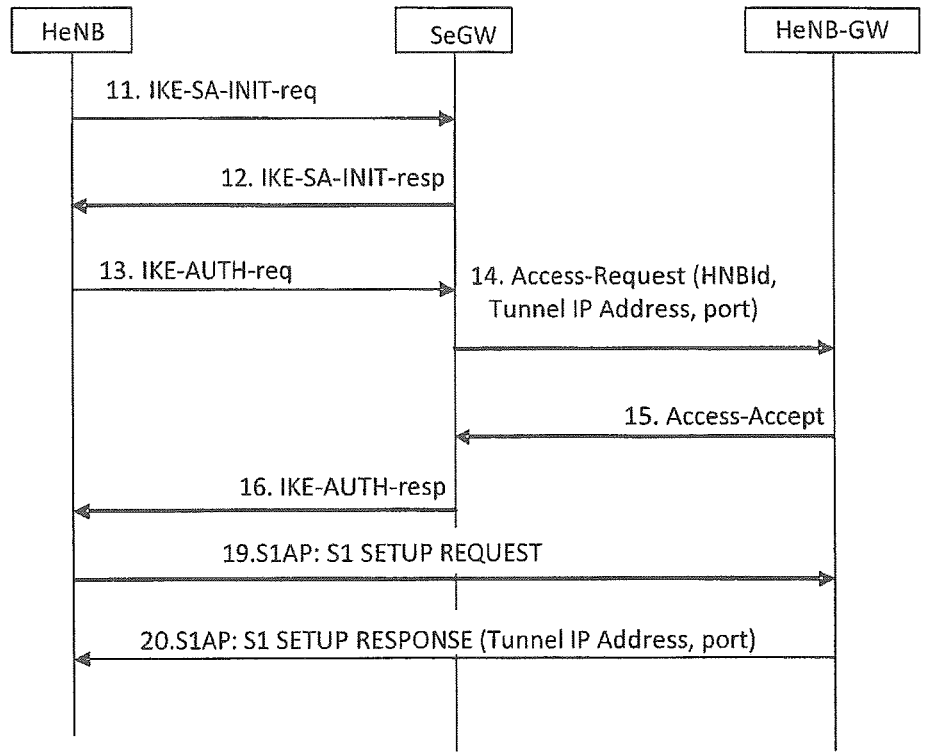
FIG. 5c is a timing diagram illustrating a modified IP security tunnel establishment procedure that can be used in the registration procedure illustrated in FIG. 3 for an E-UTRAN HNB.
Figure 5D:
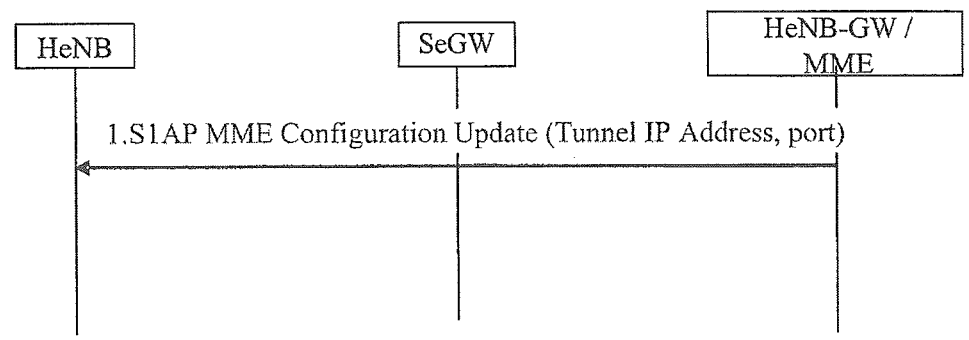
FIG. 5d illustrates a Configuration Update message sent from an HeNB-GW to the E-UTRAN HeNB forming part of the system shown in FIG. 1.

The procedures above are for the UTRAN BNB 11-1. As those skilled in the art will appreciate, similar power up procedures will be provided for E-UTRAN HeNBs 11-2, except that where the optional HeNB-GW 49 is not provided, the communications will be with the MME 33 instead of the HeNB-GW. In the case of options 1, 2 or 3 discussed above, the tunnelling information (NATed HeNB IP tunnel address and port number) will be available at the HeNB 11-2 directly without any signalling with the HeNB-GW 49 or the MME 33. FIG. 5c illustrates the procedure performed by the HeNB 11-2 on power up for the $4^{th}$ option discussed above. As shown, the IPSec tunnel is established in the same manner as shown in FIG. 5a (in steps 11 to 16). Once the secure tunnel has been established with the security gateway 51, the HeNB 11-2 sends, in step 19, the S1AP S1 SETUP REQUEST message to the HeNB-GW 49 (or MME 33 if there is no HeNB-GW). This message may include the FQDN for the HeNB-GW 49/MME 33. In response the HeNB-GW 49 (or MME 33) provides the tunnelling information (NATed HeNB IP tunnel address and port number) to the HeNB 11-2 in the S1 SETUP RESPONSE message that it sends in step 20. Additional details of these S1 messages sent in steps 19 and 20 can be found in 3GPP Technical Specification TS 36.413 v10.2.0, the content of which is incorporated herein by reference. If the HeNB-GW 49 or the MME 33 is subsequently informed of a change to the NATed IP tunnel address and/or port number for the HeNB 11, then it will send an S1AP MME CONFIGURATION UPDATE message to the HeNB 11 with the updated tunnel information, as shown in FIG. 5d.

PS and CS Bearer Admission

Once the HNB 11 has powered up and registered with the HNB-GW (or the MME), the HNB 11 can then broadcast the services that it can provide to user equipment 3 in its vicinity. Users that then register with the HNB 11 and request services, such as to make a telephone call or to access the Internet, result in service requests being sent from the HNB 11 to the core network 8 so that required bearers over the air interface (between the HNB 11 and the UE 3) for this traffic can be established and the resources through the broadband access network 15 to provide those services can be reserved. The way in which such services are requested will now be described in more detail below for the general case of packet switched (PS) data services applicable to both UTRAN and E-UTRAN devices; and for the circuit switched (CS) call establishment services applicable to UTRAN devices.

PS Service Establishment

When a mobile telephone 3 wishes to establish a packet switched (PS) service via an HNB or an HeNB 11, the HNB-GW 47 (or the HeNB-GW 49 or MME 33 in the case of the HeNB) needs to signal the HNB's NATed IP tunnel address and port number and the FQDN to the relevant nodes within the core network. In the case of a UTRAN HNB, the HNB-GW 47 will signal this tunnel information to the SGSN 43, which will forward the information to the PCRF 41 so that the appropriate resources within the broadband access network can be reserved for the HNB 11 through the establishment of a suitable S9* (or S9a) session with the BPCF 57. Similarly, in the case of an E-UTRAN HeNB, the HeNB-GW 49 or the MME 33 will signal this tunnel information to the PDN gateway 37 which will in turn signal the information to the PCRF 41 for setting up the appropriate S9* session with the broadband access network 15.

The existing proposal for establishing a PS service requires the HNB-GW 47 (or HeNB-GW/MME) to send the NATed HNB IP tunnel address, port number, FQDN to the other core network nodes in a RANAP INITIAL UE message in response to a connect message received from the HNB 11. The HNB-GW 47 (or the HeNB-GW/MME) will receive the FQDN from the HNB 11 either in a Register Request message or in a Configuration Update message. With options 1 to 3 described above, the HNB-GW 47 (HeNB-GW/MME) will receive the NATed IP address, port number and FQDN from the HNB 11 again within a Register Request message (as shown in FIG. 4a) or in a Configuration Update message (as shown in FIG. 4b). In the case of option 4 above, the HNB-GW 47 or the HeNB-GW/MME will receive this NATed IP address/port information from the SeGW 51 and FQDN from the HNB 11.

Figure 6A:
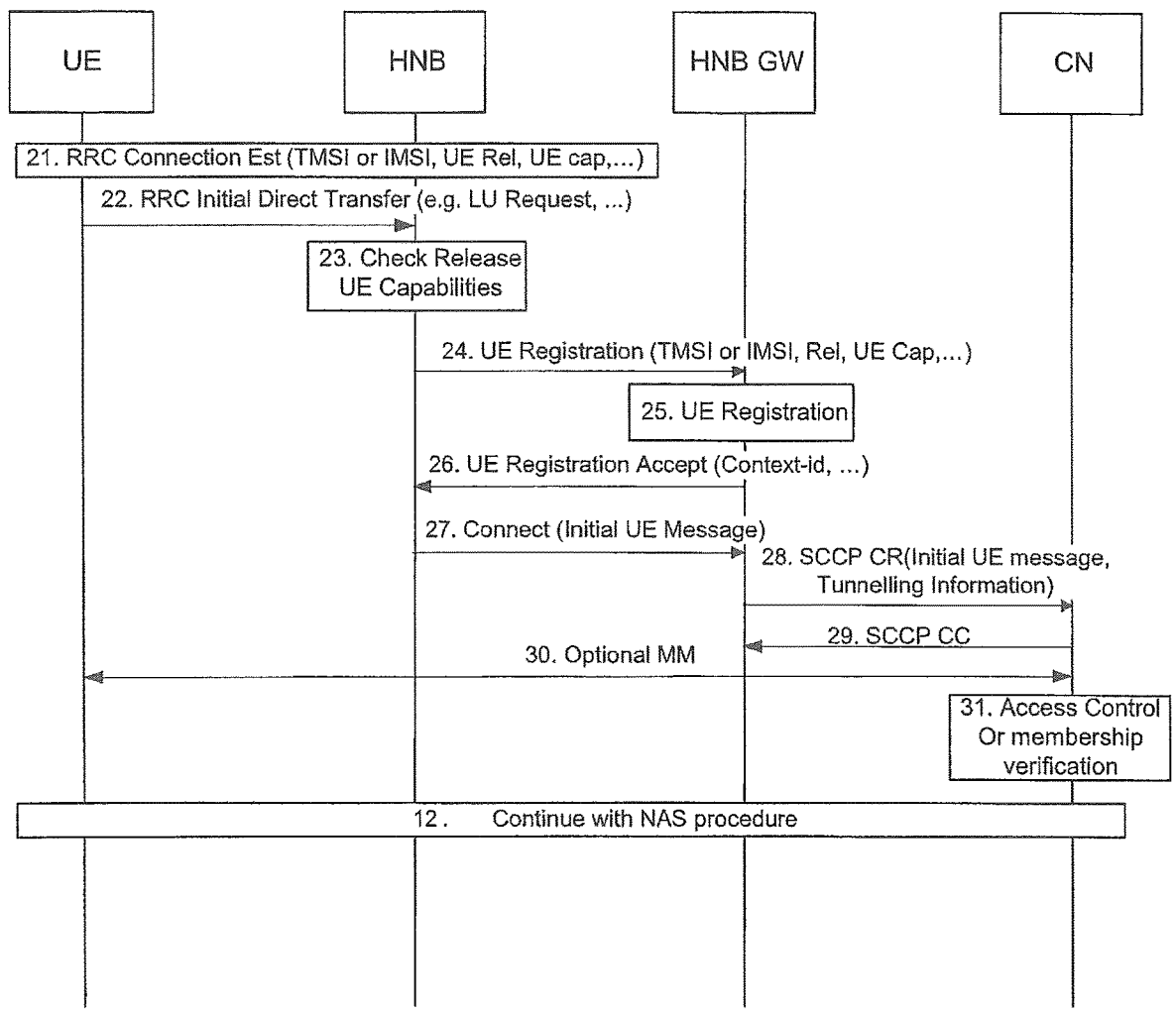
FIG. 6a is a timing diagram illustrating a proposed procedure for setting up a PS service for a requesting mobile telephone operating via an HNB shown in FIG. 1.

FIG. 6a illustrates the steps taken in this existing proposal for establishing a PS service, from the initial RRC connection request made by the user equipment 3 in step 21. As shown, in the existing proposal, the HNB-GW 47 (or the HeNB-GW/MME) is responsible for inserting the NATed HNB IP tunnel address and port number and the FQDN (labelled Tunnelling Information) in step 28, when it sends the SCCP connection request message to the other core network node. However, this requires the HNB-GW (HeNB-GW/MME) to encode the Tunnelling Information with the Initial UE message in a new RANAP message (S1AP message in the case of an HeNB) that it sends to the SGSN/MME. At present HNB-GWs do not generate RANAP/S1AP messages. They normally just forward RANAP/S1AP messages received from the HNB to the SGSN/MSC/MME etc.

Figure 6B:
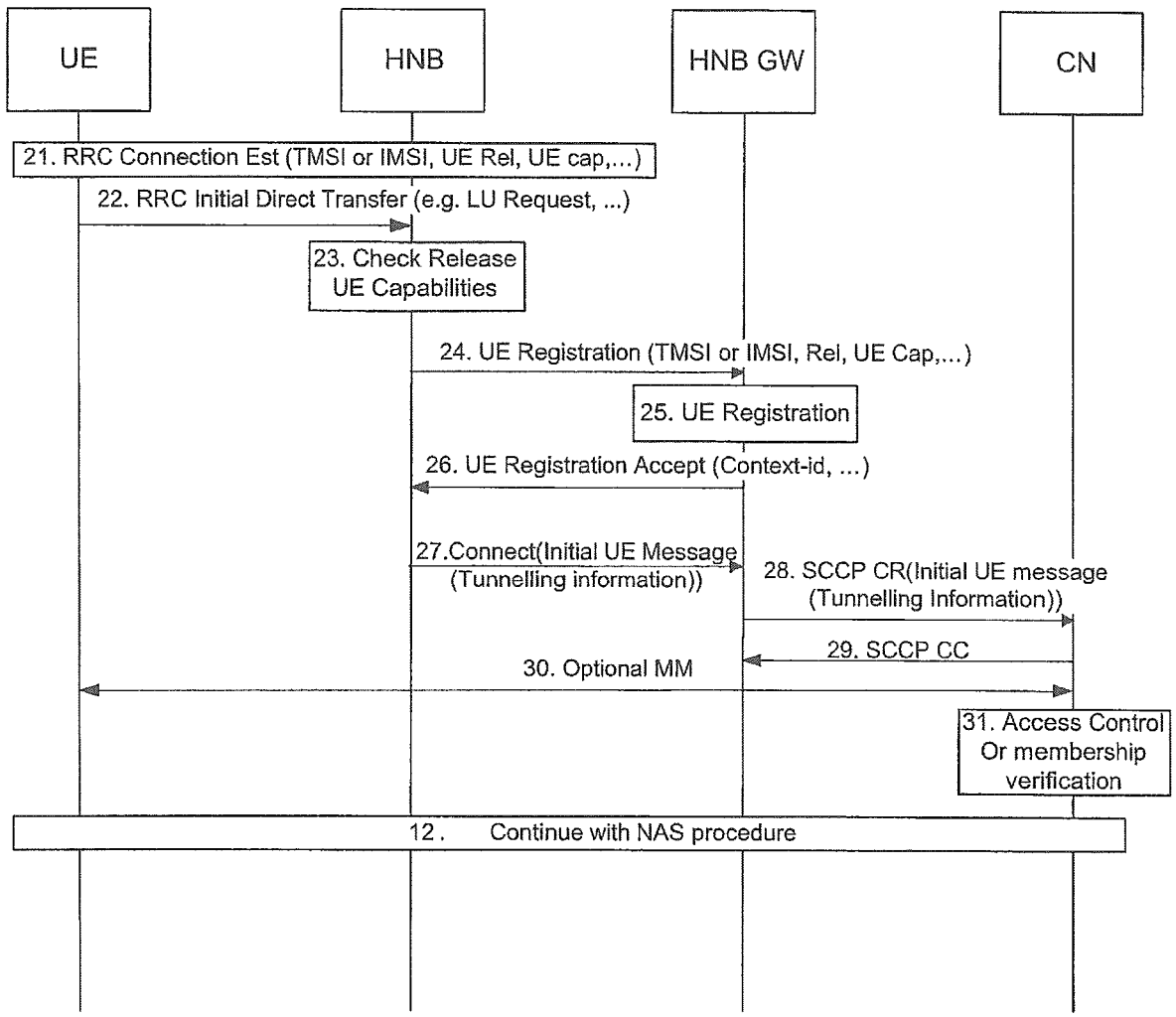
FIG. 6b is a timing diagram illustrating an alternative procedure for setting up a PS service for a requesting mobile telephone operating via an HNB shown in FIG. 1.

As an alternative, the inventor proposes that the HNB 11 should include this Tunnelling Information in the RANAP INITIAL UE MESSAGE (that is itself encapsulated inside the RUA Connect message sent at step 27 (or in the case of the E-UTRAN HeNB 11-2, the inventor proposes to include this Tunnelling Information in a SLAP message to the HeNB-GW/MME. In this case, the HNB-GW 47 (or HeNB-GW 49 or MME) only has to extract this RANAP/S1AP message and forward this to the relevant core network node in step 28, without having to generate a new RANAP/S1AP message itself. This is illustrated in FIG. 6b for a RANAP message. This process can also be used for other RUA messages. For example, the RUA DIRECT TRANSFER message or other RANAP messages such as RANAP DIRECT TRANSFER or RANAP RELOCATION COMPLETE messages etc. depending on the state of the user equipment.

In step 28, the message is sent to the relevant core network node. For UTRAN, this node is the SGSN 43/MSC 45 and for E-UTRAN, this is the serving gateway 35/PDN gateway 37. These nodes then establish relevant sessions with the PCRF 41 so that the PCRF 41 can establish the S9*/S9a interface with the BPCF 57 so that the required resources for the requested PS service are reserved through the broadband network 15.

CS Service Establishment

Figure 7A:
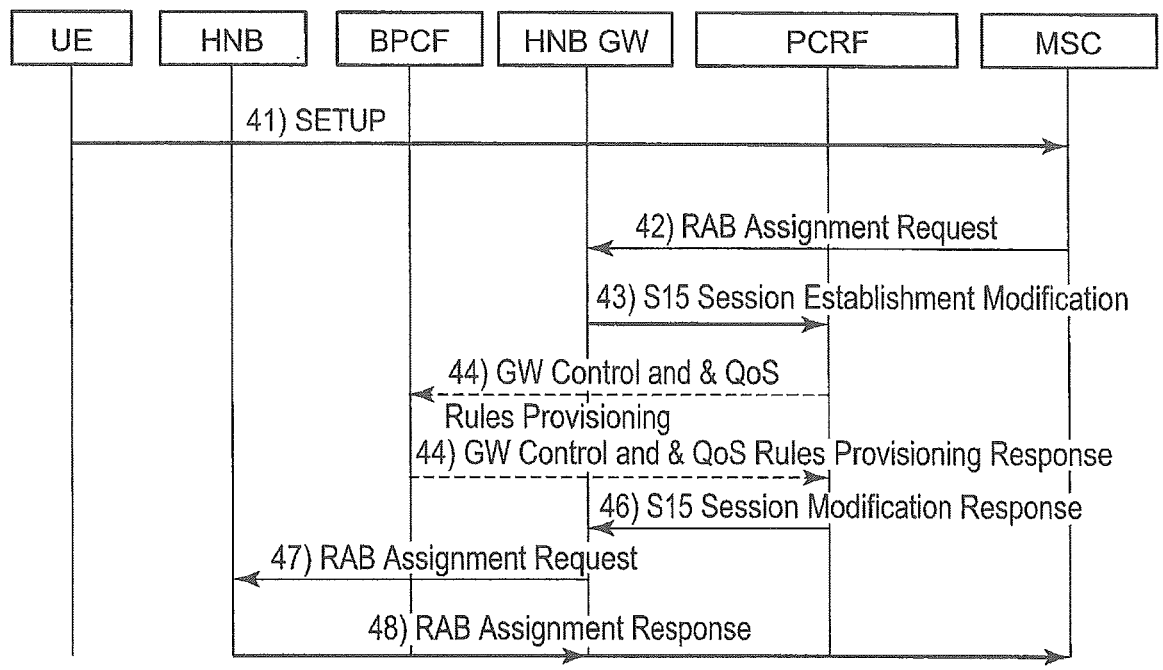
FIG. 7a is a timing diagram illustrating a proposed procedure for setting up a CS call for a requesting mobile telephone operating via an HNB shown in FIG. 1.

When a mobile telephone 3 or other user equipment wishes to establish a circuit switched (CS) call via the UTRAN HNB 11, the existing S15 session between the HNB-GW 47 and the PCRF 41 has to be modified so that resources can be reserved, if necessary, for the new call through the broadband access network 15. FIG. 7a illustrates the steps that have been proposed for dealing with this CS call establishment. As shown, in step 41, the user equipment 3 sends a SETUP message to the MSC 45. In response, in step 42, the MSC 45 sends a RAB (Radio Access Bearers) Assignment Request message towards and destined for the HNB 11. However, the existing proposal is for the HNB-GW 47 to intercept this message and to send, in step 43, a S15 Session Establishment Modification message to the PCRF 41. The HNB-GW 47 uses the HNB ID in the intercepted message to identify the correct S15 session to be modified. The S15 modification message includes QoS information derived from the RAB Assignment Request message (which in turn is determined based on the SETUP request received from the UE). In step 44, the PCRF 41 initiates the GW Control and & QoS Rules Provisioning procedure as defined in TS 23.203 v11.2.0.

In step 45, the BPCF 57 acknowledges the changes to the GW Control and & QoS Rules Provisioning to the PCRF 41. In response to this, the PCRF 41 sends, in step 46, the S15 Session modification Response to the HNB-GW 47 with the outcome of the authorisation request. If no resources in the broadband access network 15 are available then the HNB-GW 47 rejects the RAB Assignment Request and initiates the "RAB assignment failure" procedure (not shown). Otherwise, the HNB-GW 47 sends the RAB Assignment Request message on to the HNB 11 and the remainder of the call setup procedure completes as normal.

However, there are a number of problems with this suggested procedure. Firstly, it will require the HNB-GW 47 to read every RANAP message (which are messages that are supposed to be transmitted between the HNB and the SGSN/MSC, which should just pass through the HNB-GW) and based on the RAB parameters initiate the S15 Session modification procedure in order to do the QoS checking with the broadband access network 15. Secondly, if the admission control fails, then the HNB-GW 47 has to generate and send a RAB assignment failure RANAP message towards the MSC 45. Currently, the HNB-GW 47 does not generate any RANAP messages.

Figure 7B:
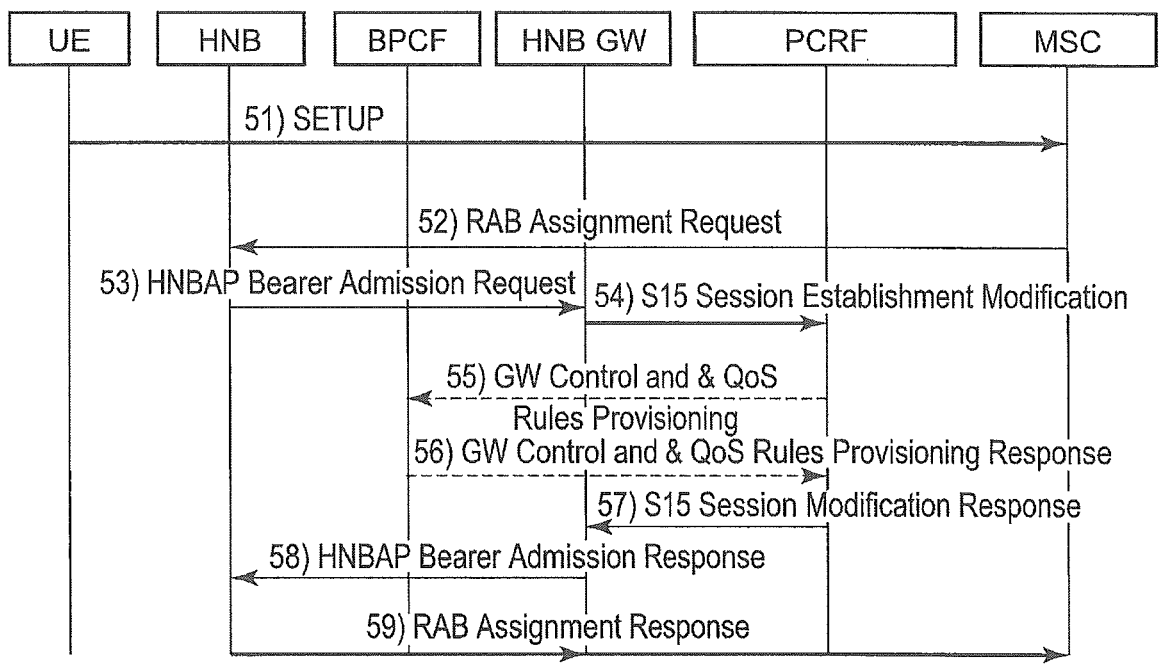
FIG. 7b is a timing diagram illustrating an alternative for setting up a CS call for a requesting mobile telephone operating via an HNB shown in FIG. 1.

Therefore, the inventor suggests that the new procedure shown in FIG. 7b should be adopted. As before, in step 51, the user equipment 3 sends a SETUP message to the MSC 45. In response, in step 52, the MSC 45 sends a RAB Assignment Request message towards and destined for the HNB 11. In this case, however, the HNB-GW 47 does not intercept the RAB Assignment Request and instead transparently forwards the request to the HNB 11. The HNB 11 needs to send the HNB-GW 47 a new HNBAP message that will trigger the HNB-GW 47 to perform the above S15 Session establishment modification procedure (steps 42 to 46 in FIG. 7a). This is achieved, in this embodiment, by the HNB 11 sending the HNB-GW 47, in step 53, an HNBAP Bearer Admission Request message that includes the CS RAB parameters included in the RAB Assignment Request. When the HNB-GW 47 receives this message, it identifies the HNB 11 that sent the message and identifies the corresponding S15 session for that HNB 11 that has to be modified. The HNB-GW 47 then sends the S15 Session Establishment Modification message to the PCRF 41 as before. The processing through steps 55 to 57 then correspond to steps 44 to 46 discussed above. In step 58, the HNB-GW 47 then sends the HNB 11 an HNBAP Bearer Admission Response message indicating if the resources in the broadband access network 15 are available. The HNB 11 then sends the MSC 45 a RAB Assignment Response message in step 59, that indicates RAB assignment failure or RAB assignment success depending on whether or not the resources in the broadband access network 15 are available and the remainder of the call setup procedure completes as normal.

UE Mobility

The discussion above has focussed on the situation when an HNB 11 powers up and when a user equipment 3 requests a new service. Similar issues will arise when a user equipment 3 is handed over to the HNB 11 either from another HNB or from a macro base station and in this case, similar procedures to those discussed above will have to be adopted.

Figure 8:
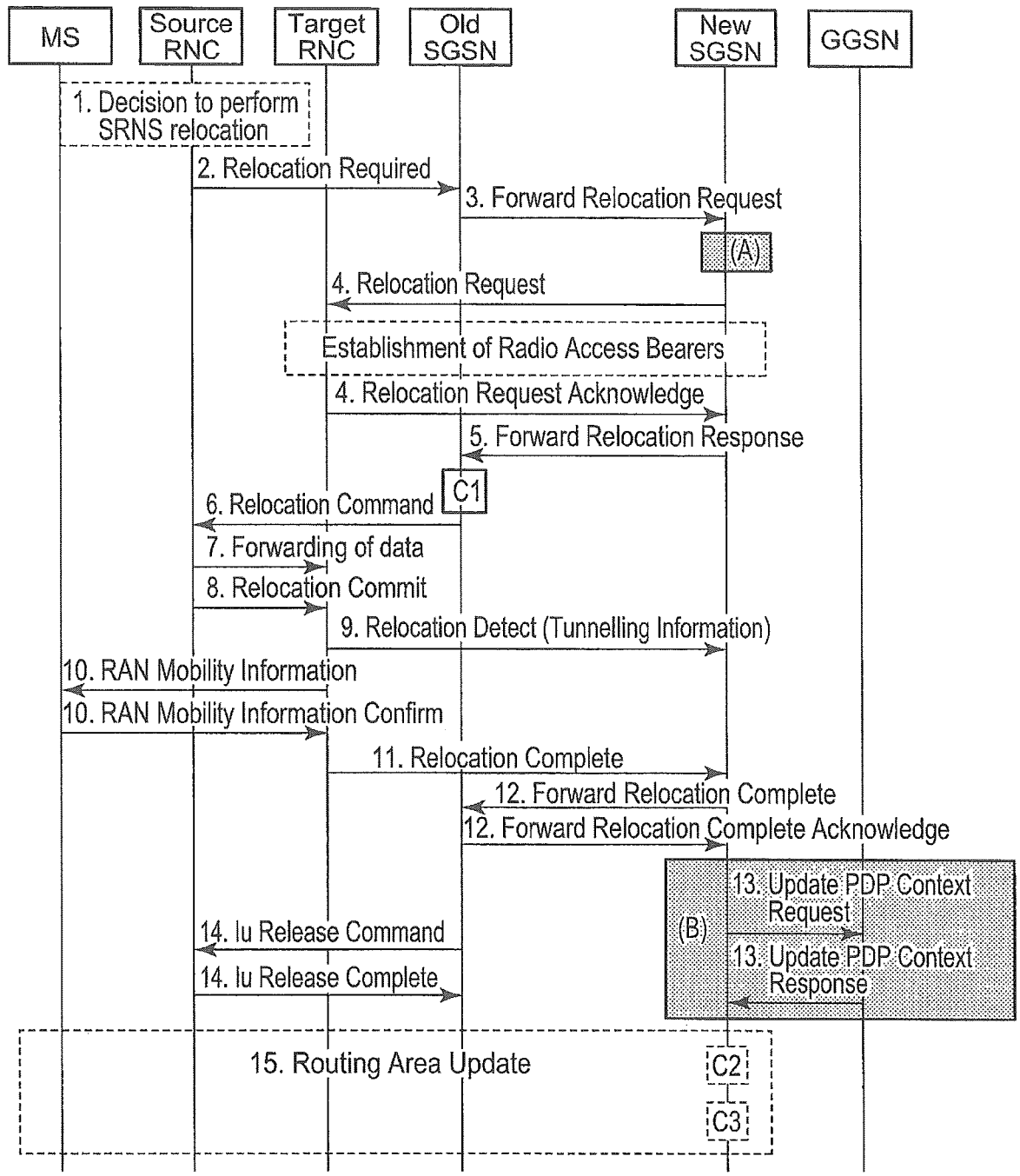
FIG. 8 is a timing diagram illustrating steps performed when a user equipment moves from a source macro base station to an HNB for packet switched services.
Figure 9:
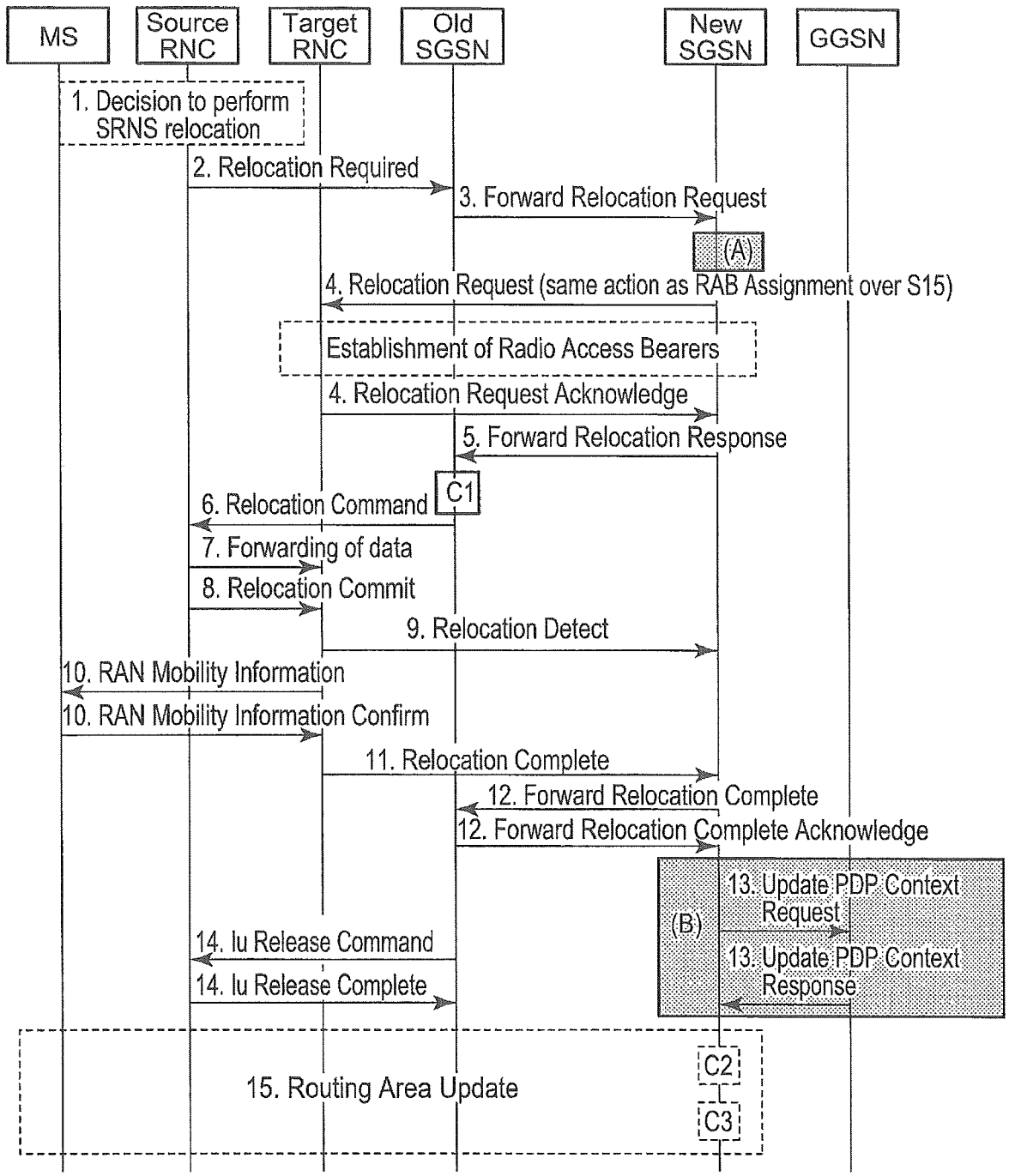
FIG. 9 is a timing diagram illustrating steps performed when a user equipment moves from a source macro base station to an HNB for circuit switched services.
Figure 10:
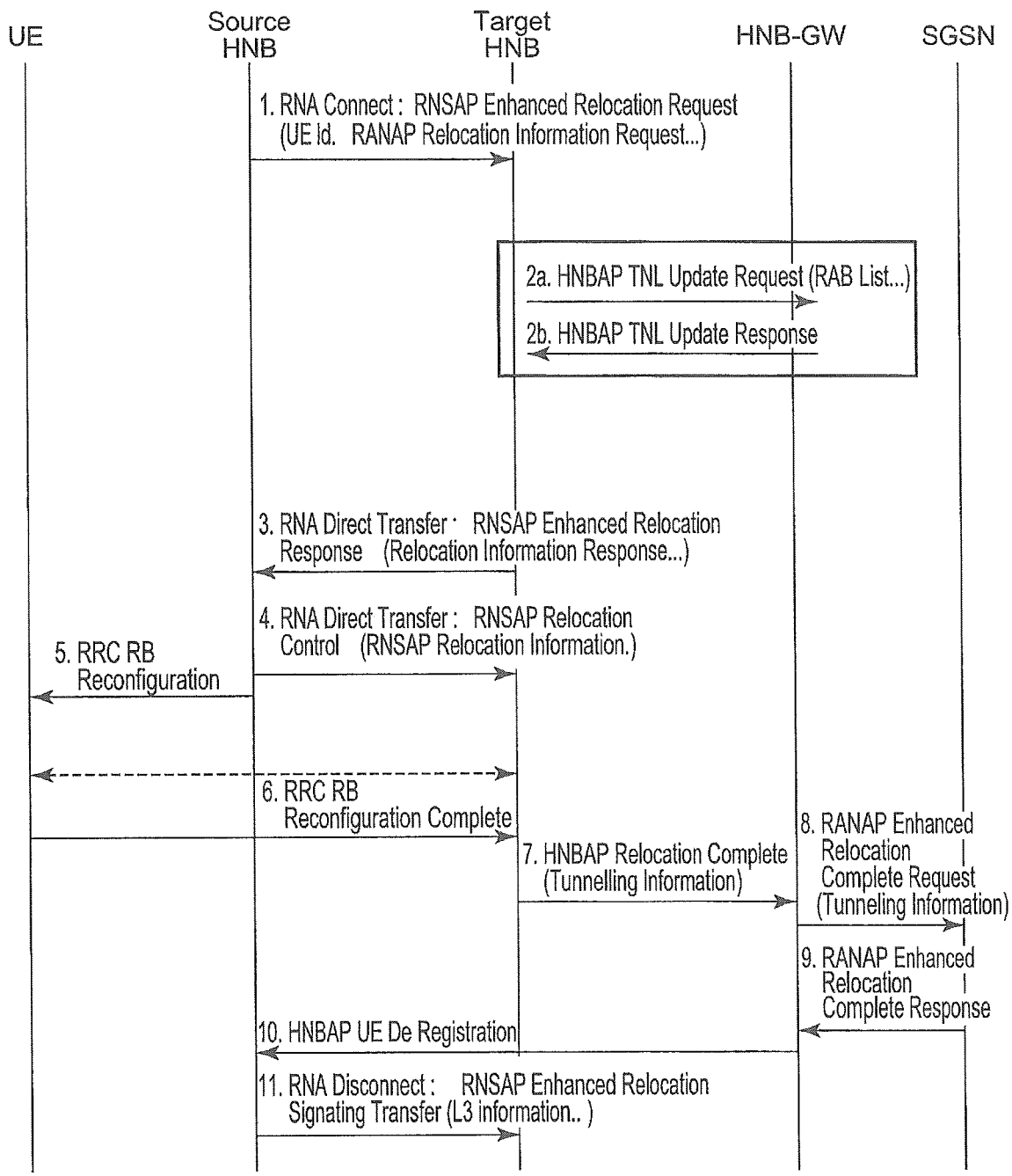
FIG. 10 is a timing diagram illustrating steps performed when a user equipment moves from a source HNB to a target HNB.

FIGS. 8 to 10 illustrate some mobility procedures and where the above described Tunnelling Information can be signalled from the target HNB-GW/MME to the relevant other core network nodes.

FIG. 8 is a timing diagram illustrating the situation when a UE moves from a macro base station (in this example a macro UTRAN base station 5) to a UTRAN HNB 11 for PS service handling. This is a generic timing diagram with the source and target "RNC" being labelled. In this case, the source RNC may be the RNC 7 associated with the source base station 5 from which the user equipment is moving and the target RNC is the HNB/HNB-GW. This procedure has already been defined in the 3GPP Technical Specification TS 23.060 v10.4.0 (FIG. 39). The only change proposed to this procedure is that the target HNB/HNB-GW (labelled Target RNC) will send the RANAP RELOCATION DETECT message (in step 9 shown in FIG. 8) that includes the Tunnelling Information (NATed IP address, port number and FQDN) to the new SGSN. The rest of the procedure would be the same as the discussion above in the section entitled PS service establishment.

FIG. 9 is a timing diagram for the same mobility scenario but for CS service handling. The procedure shown in FIG. 9 has already been defined in the 3GPP Technical Specification TS 23.060 v10.4.0 (FIG. 39). During the procedure shown in FIG. 9, when the HNB-GW receives the Relocation Request message in step 4, it will establish the S15 session in the manner discussed above with reference to FIG. 7a; or the HNB will perform the procedure shown in FIG. 7b.

FIG. 10 is a timing diagram illustrating the situation when a user equipment moves from a source HNB to a target HNB. The procedure shown in FIG. 10 has already been defined in the 3GPP Technical Specification TS 25.467 v10.2.0 (FIG. 5.7.2.1-1). The only change proposed is that the target HNB should include the above described Tunnelling Information in the HNBAP RELOCATION COMPLETE message that it sends to the HNB-GW in step 7 and the addition of new steps 8 and 9 shown in FIG. 10. The HNB-GW 47 then forwards this information on to the SGSN in step 8.

Specification Changes

As discussed above, a number of existing messages are being modified by the current proposals and a number of new messages are being introduced. These proposals will also require come changes to the existing technical specifications. Details of these changes and of these updated messages are given below. The changes are shown as underlined text. Changes for Options 1 to 3

HNBAP Procedures

Elementary Procedures (EPs)

In the following tables, all EPs are divided into Class 1 and Class 2 Procedures.

TABLE 1

| | | Class 1 | |
|---|---|---|---|
| Elementary Procedure | Initiating Message | Successful Outcome Response message | Unsuccessful Outcome Response message |
| HNB Registration | HNB REGISTER REQUEST | HNB REGISTER ACCEPT | HNB REGISTER REJECT |
| UE Registration | UE REGISTER REQUEST | UE REGISTER ACCEPT | UE REGISTER REJECT |
| TNL Update | TNL UPDATE REQUEST | TNL UPDATE RESPONSE | TNL UPDATE FAILURE |
| HNB Configuration | HNB CONFIGURATION | HNB CONFIGURATION | |

TABLE 1-continued

| | Class 1 | | |
|---|---|---|---|
| Elementary Procedure | Initiating Message | Successful Outcome Response message | Unsuccessful Outcome Response message |
| Transfer | TRANSFER REQUEST | TRANSFER RESPONSE | |

TABLE 2

| Class 2 | |
|---|---|
| Elementary Procedure | Message |
| HNB De-Registration | HNB DE-REGISTER |
| UE De-Registration | UE DE-REGISTER |
| Error Indication | ERROR INDICATION |
| CSG Membership Update | CSG MEMBERSHIP UPDATE |
| Relocation Complete | RELOCATION COMPLETE |
| HNB Configuration Update | HNB CONFIGURATION UPDATE |

HNB Registration Procedure
General

The purpose of the HNB Registration Procedure is to register the HNB with the HNB-GW to enable the HNB-GW to provide service and core network connectivity for the HNB and if supported and configured, to enable Iurh connectivity via the HNB-GW. This procedure shall be the first HNBAP procedure triggered after the Iuh signalling transport has been successfully established.

Successful Operation

The HNB shall initiate this procedure by sending a HNB REGISTER REQUEST message whenever it needs to commence operations and requiring service from the HNB-GW.

If the HNB is CSG capable and operates in a Closed access mode as defined in TS 22.220 [15], then it shall provide the CSG-ID IE and may provide the HNB Cell Access Mode IE within the HNB REGISTER REQUEST message.

If the HNB is supporting ETWS it shall provide the Service Area For Broadcast IE within the HNB REGISTER REQUEST message.

If the HNB operates in a Hybrid access mode as defined in TS 22.220 [15], then it shall provide the CSG-ID IE and HNB Cell Access Mode IE within the HNB REGISTER REQUEST message.

If the HNB operates in an Open access mode as defined in TS 22.220 [15], then it shall provide the HNB Cell Access Mode IE within the HNB REGISTER REQUEST message.

If the HNB supports RNSAP Relocation it shall provide the Iurh signalling TNL Address IE to the HNB-GW within the HNB REGISTER REQUEST message.

If HNB supports the BBF interworking it shall also provide the BBF Tunnelling Information IE to the HNB-GW within the HNB REGISTER REQUEST message. If supported, the HNB shall include the PSC IE in the REGISTER REQUEST message.

If the registration is successful, the HNB-GW will respond with a HNB REGISTER ACCEPT message indicating acceptance and registration. If the Iurh signalling TNL Address IE is included in the HNB REGISTER ACCEPT message, the HNB shall, if supported, establish a transport layer session to the indicated address to support Iurh connectivity via the HNB-GW.

If the HNB-GW is capable of de-multiplexing, then the MuxPortNumber IE may be included in the HNB REGISTER ACCEPT message.

HNB Register Request

This message is sent by the HNB to the HNB-GW to register the HNB at the HNB-GW.

Direction: HNB→HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| Service Area For Broadcast | O | | SAC 9.2.13 | | YES | ignore |
| HNB Cell Access Mode | O | | 9.2.31 | | YES | reject |
| PSC | O | | 9.2.41 | | YES | ignore |
| Iurh signalling TNL Address | O | | IP Address 9.2.8 | HNB IP address used for direct Iurh connectivity | YES | ignore |
| BBF Tunnelling Information | O | | 9.2.yy | BBF Tunnelling Information | YES | ignore |

HNB Configuration Update
This message is sent by the HNB to the HNB-GW to update the configuration information. The HNB shall send this message whenever it needs to indicate the updated Configuration information to the HNB-GW.
Direction: HNB→HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| Cause | M | | 9.2.15 | | YES | ignore |
| BBF Tunnelling Information | O | | 9.2.yy | BBF Tunnelling Information | YES | ignore |

FQDN
This IE defines a Fully Qualified Domain Name.

| IE/GROUP NAME | Presence | Range | IE Type and Reference | Semantics Description |
|---|---|---|---|---|
| FQDN | O | | OCTET STRING(64) | |

BBF Tunnelling Information
This IE defines BBF Tunnelling information (the NATed IP address, port number and FQDN) for the 3GPP BBF interworking.

| IE/GROUP NAME | Presence | Range | IE Type and Reference | Semantics Description |
|---|---|---|---|---|
| IP Address | M | | 9.2.8 | |
| UDP Port | M | | 9.2.zz | |
| FQDN | M | | 9.2.xx | |

UDP Port Number
This IE defines UDP port number.

| IE/Group Name | Presence | Range | IE type and reference | Semantics description |
|---|---|---|---|---|
| UDP Port | | | OCTET STRING (1 ... 2, ... ) | |

Changes for Option 4
HNBAP Procedures
Elementary Procedures (EPs)
In the following tables, all EPs are divided into Class 1 and Class 2 Procedures.

TABLE 1

Class 1

| Elementary Procedure | Initiating Message | Successful Outcome Response message | Unsuccessful Outcome Response message |
|---|---|---|---|
| HNB Registration | HNB REGISTER REQUEST | HNB REGISTER ACCEPT | HNB REGISTER REJECT |
| UE Registration | UE REGISTER REQUEST | UE REGISTER ACCEPT | UE REGISTER REJECT |
| TNL Update | TNL UPDATE REQUEST | TNL UPDATE RESPONSE | TNL UPDATE FAILURE |
| HNB Configuration Transfer | HNB CONFIGURATION TRANSFER REQUEST | HNB CONFIGURATION TRANSFER RESPONSE | |

TABLE 2

Class 2

| Elementary Procedure | Message |
|---|---|
| HNB De-Registration | HNB DE-REGISTER |
| UE De-Registration | UE DE-REGISTER |
| Error Indication | ERROR INDICATION |
| CSG Membership Update | CSG MEMBERSHIP UPDATE |
| Relocation Complete | RELOCATION COMPLETE |
| HNB Configuration Update | HNB CONFIGURATION UPDATE |

HNB Registration Procedure
General
The purpose of the HNB Registration Procedure is to register the HNB with the HNB-GW to enable the HNB-GW to provide service and core network connectivity for the HNB and if supported and configured, to enable Iurh connectivity via the HNB-GW. This procedure shall be the first HNBAP procedure triggered after the Iuh signalling transport has been successfully established.
Successful Operation
The HNB shall initiate this procedure by sending a HNB REGISTER REQUEST message whenever it needs to commence operations and requiring service from the HNB-GW.
If the HNB is CSG capable and operates in a Closed access mode as defined in TS 22.220 [15], then it shall provide the CSG-ID IE and may provide the HNB Cell Access Mode IE within the HNB REGISTER REQUEST message.
If the HNB is supporting ETWS it shall provide the Service Area For Broadcast IE within the HNB REGISTER REQUEST message.

If the HNB operates in a Hybrid access mode as defined in TS 22.220 [15], then it shall provide the CSG-ID IE and HNB Cell Access Mode IE within the HNB REGISTER REQUEST message.

If the HNB operates in an Open access mode as defined in TS 22.220 [15], then it shall provide the HNB Cell Access Mode IE within the HNB REGISTER REQUEST message.

If the HNB supports RNSAP Relocation it shall provide the Iurh signalling TNL Address IE to the HNB-GW within the HNB REGISTER REQUEST message.

If HNB supports the BBF interworking it shall also provide the FQDN IE to the HNB-GW within the HNB REGISTER REQUEST message. If supported, the HNB shall include the PSC IE in the REGISTER REQUEST message.

If the registration is successful, the HNB-GW will respond with a HNB REGISTER ACCEPT message indicating acceptance and registration. If the Iurh signalling TNL Address IE is included in the HNB REGISTER ACCEPT message, the HNB shall, if supported, establish a transport layer session to the indicated address to support Iurh connectivity via the HNB-GW.

If the HNB-GW is capable of de-multiplexing, then the MuxPortNumber IE may be included in the HNB REGISTER ACCEPT message.

If HNB-GW supports the BBF interworking it shall also provide the NATed Tunnel IP Address and UDP Port IE to the HNB within the HNB REGISTER ACCEPT message.

HNB Configuration Update Procedure

General

The purpose of the HNB Configuration Update Procedure is to exchange the configuration information by the HNB-GW or the HNB.

Successful Operation (HNB Originated)

The HNB shall initiate this procedure whenever it needs to indicate the updated Configuration information to the HNB-GW.

Successful Operation (HNB-GW Originated)

The HNB-GW shall initiate this procedure whenever it needs to indicate the updated configuration information to the HNB.

HNB Register Request

This message is sent by the HNB to the HNB-GW to register the HNB at the HNB-GW.

Direction: HNB→HNB-GW

In this case, the FQDN Information Element (defined below) is new to this existing request message and will carry the FQDN for the broadband access network to which the HNB is connected.

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| HNB Identity | M | | 9.2.2 | | YES | reject |
| HNB Location Information | M | | 9.2.3 | | YES | reject |
| PLMN-ID | M | | 9.2.14 | | YES | reject |
| Cell-ID | M | | 9.2.25 | | YES | reject |
| LAC | M | | 9.2.11 | | YES | reject |
| RAC | M | | 9.2.12 | | YES | reject |
| SAC | M | | 9.2.13 | | YES | reject |
| CSG-ID | O | | 9.2.27 | | YES | reject |
| Service Area For Broadcast | O | | SAC 9.2.13 | | YES | ignore |
| HNB Cell Access Mode | O | | 9.2.31 | | YES | reject |
| PSC | O | | 9.2.41 | | YES | ignore |
| Iurh signalling TNL Address | O | | IP Address 9.2.8 | HNB IP address used for direct Iurh connectivity | YES | ignore |
| FQDN | O | | 9.2.XX | | YES | ignore |

HNB Register Accept

This message is sent by the HNB-GW to the HNB as a successful response to a HNB REGISTER REQUEST message.

Direction: HNB-GW→HNB

In this case, the NATed Tunnel IP address and the UDP Port Number parameters are new and are used to carry the NATed HNB IP address and the NATed UDP port number respectively.

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| RNC-ID | M | | 9.2.26 | | YES | reject |

-continued

| PARAMETER | PRESENCE | RANGE | IE Type and Reference | Semantics Description | Criticality | Assigned Criticality |
|---|---|---|---|---|---|---|
| Mux Port Number | O | | 9.2.29 | The mux port number at which HNB-GW expects to receive multiplexed packets. | YES | Ignore |
| Iurh signalling TNL Address | O | | IP Address 9.2.8 | HNB-GW IP address used for Iurh connectivity via the HNB-GW | YES | ignore |
| NATed Tunnel IP address | O | | IP Address 9.2.8 | HNB NATed Tunnel IP address | YES | ignore |
| UDP Port Number | O | | 9.2.zz | | YES | Ignore |

HNB Configuration Update

This message is sent by the HNB to the HNB-GW or HNB-GW to HNB to update the configuration information.

Direction: HNB→HNB-GW or HNB-GW→HNB

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| Cause | M | | 9.2.15 | | YES | ignore |
| NATed Tunnel IP address | O | | IP Address 9.2.8 | HNB NATed Tunnel IP address | YES | ignore |
| UDP Port Number | O | | 9.2.zz | | YES | Ignore |
| FQDN | O | | 9.2.XX | | YES | ignore |

FODN

This IE defines an Fully Qualified Domain Name.

| IE/GROUP NAME | Presence | Range | IE Type and Reference | Semantics Description |
|---|---|---|---|---|
| FQDN | O | | OCTET STRING(64) | |

BBF Tunnelling Information

This IE defines BBF Tunnelling information for the 3GPP BBF interworking.

| IE/GROUP NAME | Presence | Range | IE Type and Reference | Semantics Description |
|---|---|---|---|---|
| IP Address | M | | 9.2.8 | |
| UDP Port | M | | 9.2.zz | |
| FQDN | M | | 9.2.xx | |

UDP Port Number

This IE defines UDP port number.

| IE/Group Name | Presence | Range | IE type and reference | Semantics description |
|---|---|---|---|---|
| UDP Port | | | OCTET STRING (1 . . 2, . . . ) | |

Bearer Admission Response

This new message is sent by the HNB 11 to the HNB-GW 47 (see step 53 in FIG. 7b) to request the bearer admission over the S15 interface.

Direction: HNB→HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| Context-ID | M | | 9.2.9 | | YES | reject |
| RAB List | M | | 9.2.32 | | YES | reject |
| Update Cause | M | | 9.2.39 | | YES | reject |

Bearer Admission Response

This new message is sent by the HNB-GW 47 (see step 58 in FIG. 7b) to inform the HNB 11 that a bearer admission over S15 interface has been successful in the HNB-GW 47.

Direction: HNB-GW→HNB

| PARAMETER | PRESENCE | RANGE | IE Type and Reference | Semantics Description | Criticality | Assigned Criticality |
|---|---|---|---|---|---|---|
| Message Type | M | | 9.2.1 | | YES | reject |
| Context-ID | M | | 9.2.9 | | YES | reject |

Bearer Admission Failure

This new message is sent by the HNB-GW 47 to inform the HNB 11 that bearer admission has failed.

Direction: HNB-GW→HNB

| IE/Group Name | Presence | Range | IE type and reference | Semantics description | Criticality | Assigned Criticality |
|---|---|---|---|---|---|---|
| Message Type | M | | 9.2.1 | | 1. | 1. |
| Context-ID | M | | 9.2.9 | | 2. | 2. |
| Cause | M | | 9.2.15 | | 3. | 3. |
| Criticality Diagnostics | O | | 9.2.16 | | 4. | 4. |

Relocation Complete

This message is sent by the HNB 11 to inform the HNB-GW 47 that a relocation is completed.

Direction: HNB→HNB GW

In this case, the BBF Tunnelling information Information Element is new (as defined above).

| IE/Group Name | Presence | Range | IE type and reference | Semantics description | Criticality | Assigned Criticality |
|---|---|---|---|---|---|---|
| Message Type | M | | 9.2.1 | | 1. | 1. |
| Context-ID | M | | 9.2.9 | | 2. | 2. |
| BBF Tunnelling information | O | | 9.2.yy | | 3. | 3. |

RAB List

This IE provides a RAB specific information list for admission control over the S15 interface.

| | | | | | | |
|---|---|---|---|---|---|---|
| RABs To Be Setup List | O | | | | YES | reject |
| >RABs To Be Setup Item IEs | | 1 to <maxnoofRABs> | | | EACH | reject |
| >>CN Domain Indicator | M | | 9.2.1.5 | — | | |
| >>RAB ID | M | | 9.2.1.2 | — | | |
| >>RAB Parameters | M | | 9.2.1.3 | — | | |
| >>User Plane Information | M | | | | | |
| >>>User Plane Mode | M | | 9.2.1.18 | — | | |
| >>>UP Mode Versions | M | | 9.2.1.19 | — | | |

| Range bound | Explanation |
|---|---|
| maxnoofRABs | Maximum no. of RABs for one UE. Value is 256. |

Security Gateway

Figure 11:
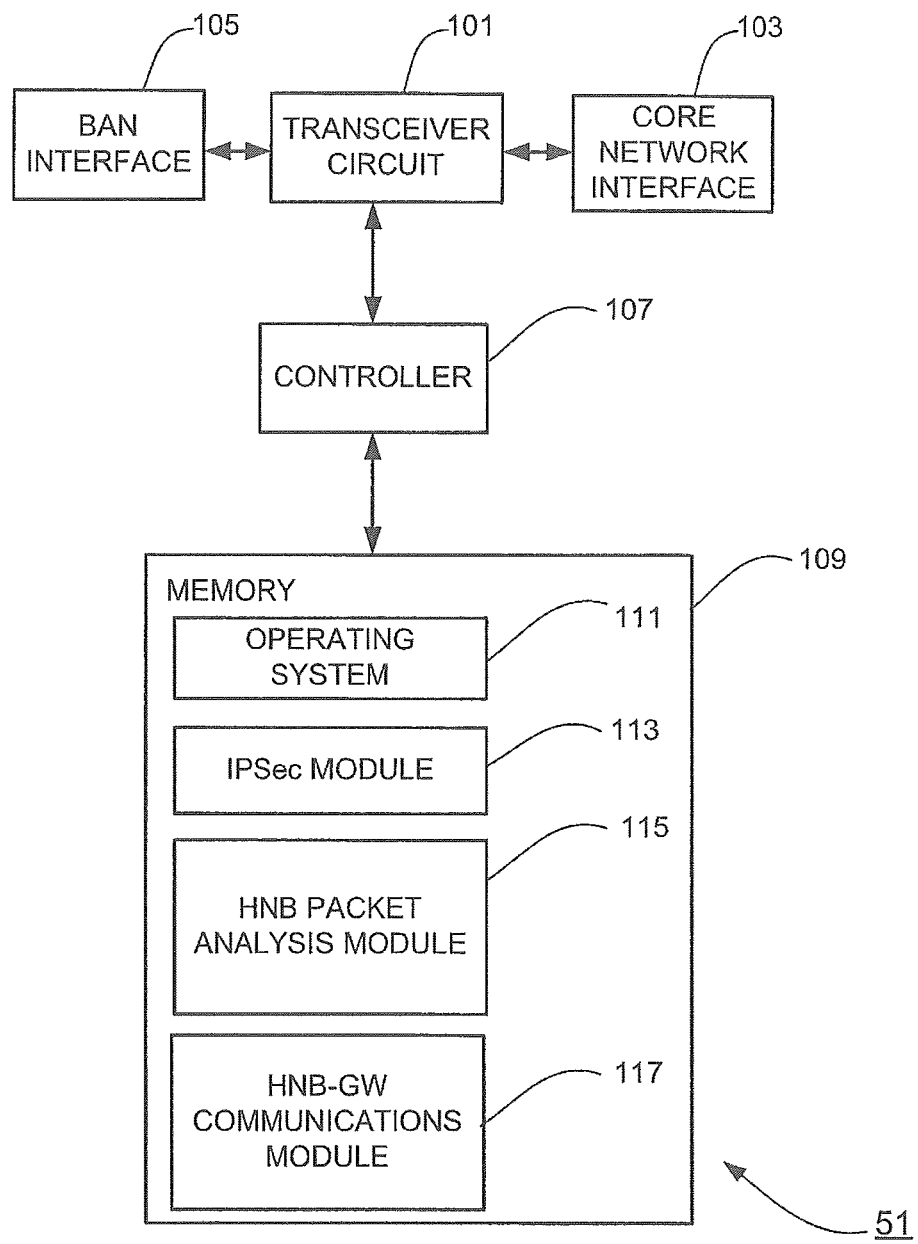
FIG. 11 is a block diagram of a Security gateway forming part of the mobile telephone core network shown in FIG. 1.

FIG. 11 schematically illustrates the main components of the security gateway (SeGW) 51 used in this embodiment and shown in FIG. 2. As shown, the SeGW 51 includes a transceiver circuit 101 which is operable to transmit signals to and to receive signals from other nodes within the core network 8 via a core network interface 103; and which is operable to transmit signals to and to receive signals from nodes within the broadband access network 15 via a BAN interface 105. As shown, the SeGW 51 also includes a controller 107 which controls the operation of the SeGW 51 and which is connected to the transceiver circuit 101. The controller 107 operates in accordance with software instructions stored within memory 109. As shown, these software instructions include, among other things, an operating system 111, an IPSec module 113, an BNB packet analysis module 115 and an HNB-GW communication module 117.

In this embodiment the IPSec module 113 is responsible for establishing the secure tunnel with the HNB 11 through the broadband access network 15 via the BAN interface 105. The HNB packet analysis module 115 is responsible for analysing the packets received from the BNB 11 to determine its NATed IP address and its NATed UDP port number which are provided in the header of the received packets. The analysis module 115 then passes the determined NATed IP address and NATed port number to the HNB-GW communication module 117 for sending to the HNB-GW 47.

Home Base Station

Figure 12:
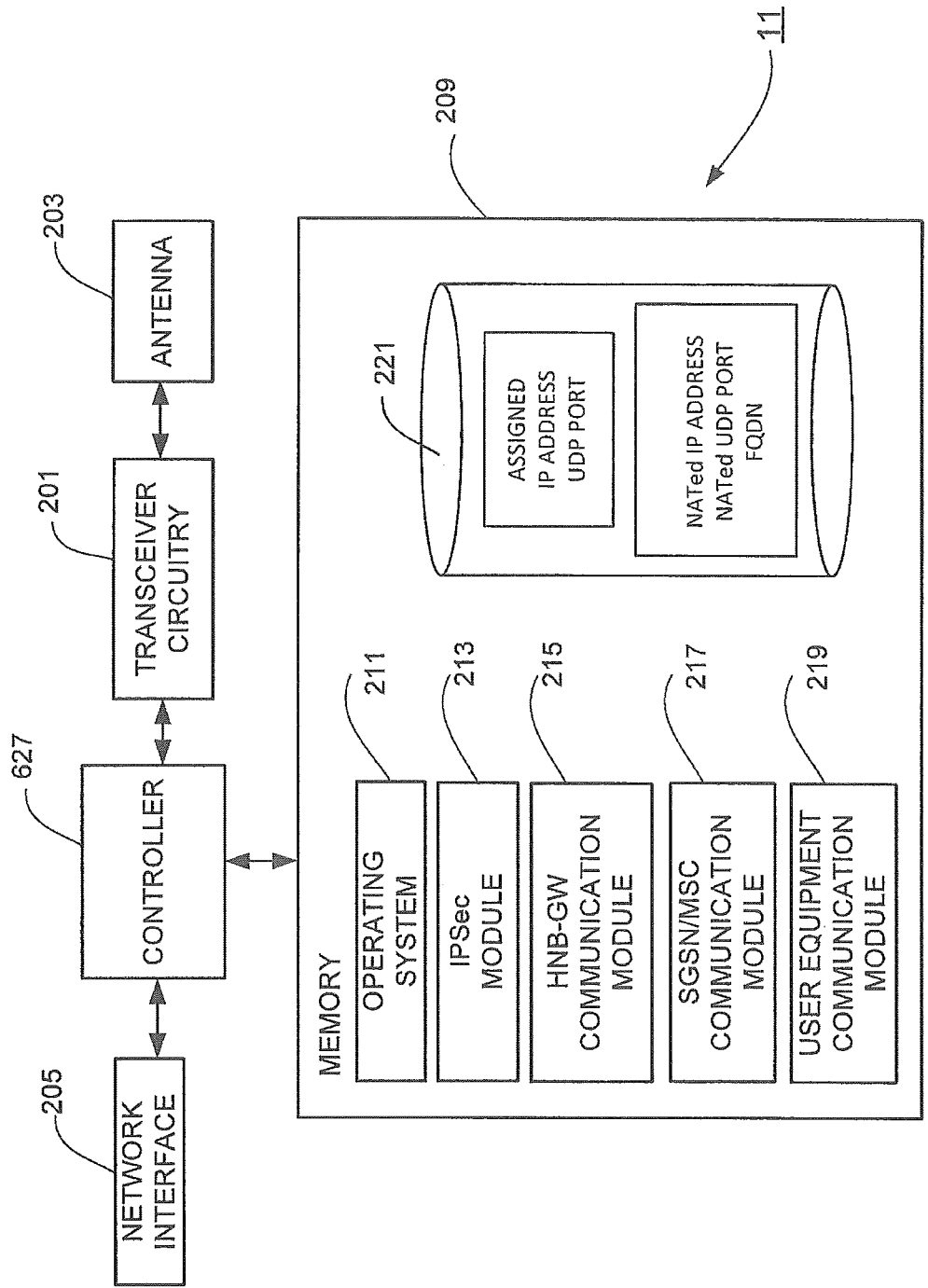
FIG. 12 is a block diagram of a home base station forming part of the system shown in FIG. 1.

FIG. 12 is a block diagram illustrating the main components of the UTRAN home base stations (HNB) 11-1 shown in FIG. 1. As shown, the HNB 11 includes transceiver circuitry 201 which is operable to transmit signals to, and to receive signals from, mobile telephones 3 or other user equipment via one or more antennae 203 and which is operable to transmit signals to and to receive signals from the core network 8 via a network interface 205. The operation of the transceiver circuitry 201 is controlled by a controller 207 in accordance with software stored in memory 209. The software includes, among other things, an operating system 211, an IPSec module 213, an HNB-GW communication module 215; an SGSN/MSC communication module 217 and a user equipment communication module 219. The memory 209 also holds a data store 221, where the HNB 11 stores, among other things, the IP address that is assigned to it by the broadband access network 15 or the residential gateway 13; and the HNB's NATed IP address, NATed UDP port number and the FQDN for the part of the IP network to which the HNB 11 is connected via the residential gateway 13.

The IPSec module 213 is responsible for establishing the secure tunnel with the SeGW 51, through the broadband access network 15 via the network interface 205. The HNB-GW communication module 215 is responsible for sending HNBAP/RUA messages to and receiving HNBAP messages from the HNB-GW 47, including the messages discussed above. The SGSN/MSC communication module 217 is responsible for sending the RANAP messages to and receiving RANAP messages from the SGSN 43 and the MSC 45. Of course, these RANAP messages are transmitted transparently through the HNB-GW 47. The user equipment communication module 219 is for communicating with user equipment using the transceiver circuitry 201 and the one or more antennae 203.

The E-UTRAN HNB 11-2 shown in FIG. 1 will have similar components to those shown in FIG. 12. The main difference is that there may not be an HNB-GW communication module 215 and instead of an SGSN/MSC communication module 217, there will be an MME communication module. Also, the HeNB 11-2 will not communicate using the HNBAP protocol, but using the E-UTRAN protocols such as the S1AP protocol.

HNB Gateway

Figure 13:
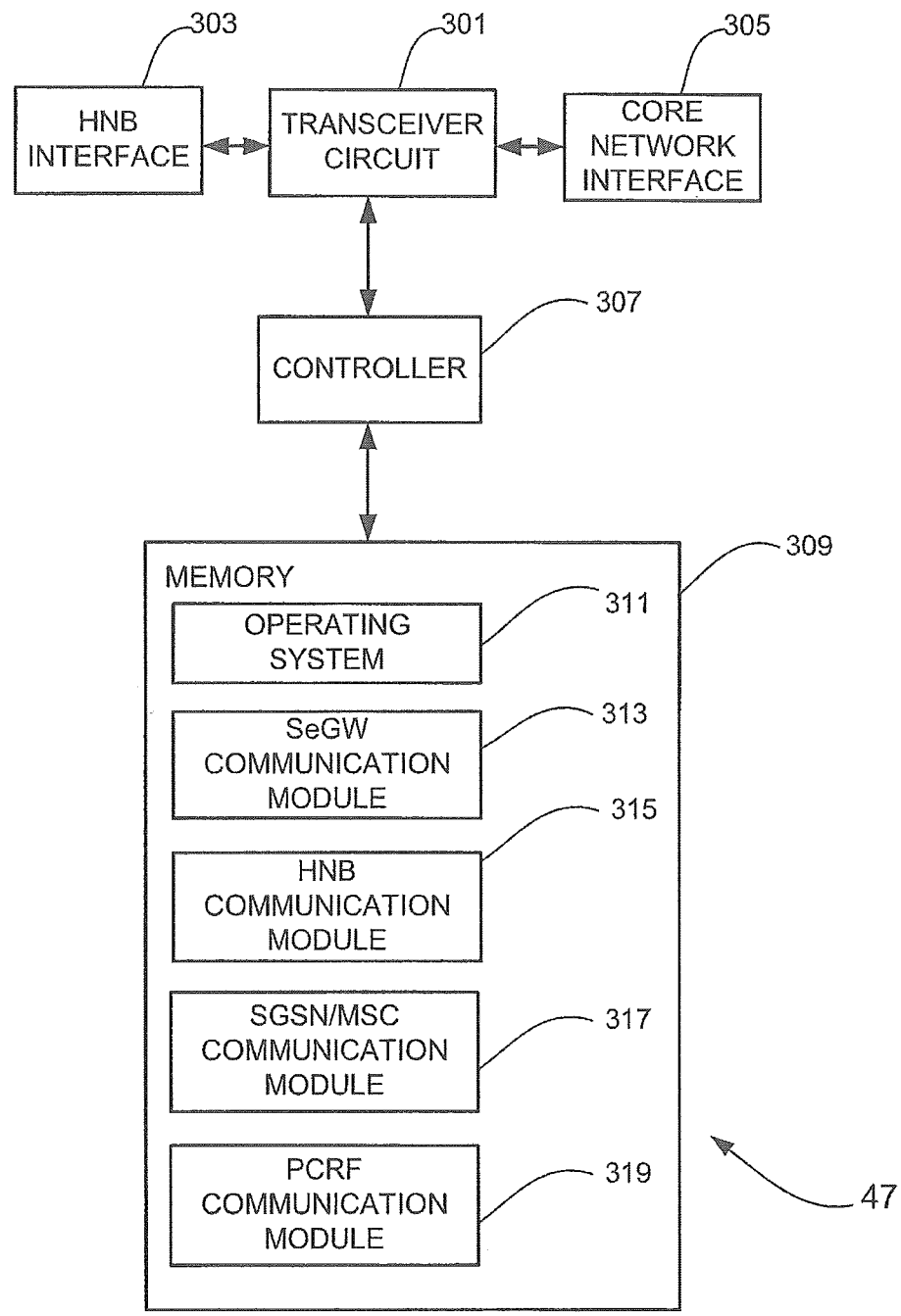
FIG. 13 is a block diagram of an HNB-GW or a mobility management entity (MME) forming part of the system shown in FIG. 1.

FIG. 13 is a block diagram illustrating the main components of the UTRAN HNB gateway (HNB-GW) 47 shown in FIG. 2. As shown, the HNB-GW 47 includes a transceiver circuit 301 which is operable to transmit signals to, and to receive signals from, the HNB 11 via the HNB interface 303 and which is operable to transmit signals to and to receive signals from other nodes in the core network 8 (such as the SGSN 43 and the MSC 45) via a core network interface 305. The operation of the transceiver circuit 301 is controlled by a controller 307 in accordance with software stored in memory 309. The software includes, among other things, an operating system 311, an SeGW communication module 313, an HNB communication module 315, an SGSN/MSC communication module 317 and a PCRF communications module 319.

The SeGW communication module 313 is responsible for communicating with the SeGW 51—for example to receive the NATed IP address and NATed UDP port number for the HNB 11. The HNB communication module 315 is responsible for communicating with the HNB 11 in the manner discussed above. The SGSN/MSC communication module 317 is responsible for communicating with the SGSN 43 or the MSC 45 in the manner discussed above. The PCRF communications is responsible for establishing the S15 session with the PCRF 41 and for modifying the S15 session when a new service request is received.

In the above description, the SeGW 51, the HNB-GW 47 and the HNB 11 are described, for ease of understanding, as having a number of discrete modules (IPSec modules, communication modules and analysis modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A detailed embodiment has been described above. As those skilled in the art will appreciate, a number of modifications and alternatives can be made to the above embodiment whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the HNB each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the HNB, HNB-GW, SeGW etc as a signal over a computer network, or on a recording medium. Further, the functionality performed by part or all of this software may be performed using one or more dedicated hardware circuits. However, the use of software modules is preferred as it facilitates the updating of the base stations, gateways, and the mobile telephones in order to update their functionalities.

Various other modifications will be apparent to those skilled in the art and will not be described in further detail here.

This application is based upon and claims the benefit of priority from United Kingdom patent application No. 1113942.5, filed on Aug. 12, 2011, the disclosure of which is incorporated herein in its entirety by reference.

The invention claimed is:

1. A home base station (HNB) comprising:
   an interface for providing access to a broadband access network; and
   a controller and a transceiver wherein the controller is configured:
      to control the transceiver to receive a local internet protocol (IP) address from the broadband access network;
      to control the transceiver to signal tunnel information to a home base station gateway (HNB-GW), the signal tunnel information being provided in a dedicated tunnel-information element (IE) of an HNB register request message; and
      to detect Network Address Translation/Network Address and Port Translation (NAT/NAPT);
   wherein, when NAT/NAPT is detected, the controller is configured to include, in the signal tunnel information IE of the HNB register request message, the HNB's NATed IP address and a User Datagram Protocol (UDP) port number to support establishment and management, by the HNB-GW, of an S15 session with a policy rules and charging function (PCRF).

2. A home base station gateway (HNB-GW) comprising:
   a controller and a transceiver wherein the controller is configured:

to control the transceiver to receive, from a home base station (HNB), tunnel information, the tunnel information being provided in a dedicated tunnel-information information element (IE) of an HNB register request message, wherein, when Network Address Translation/Network Address and Port Translation (NAT/NAPT) is detected, the tunnel information IE of the HNB register request message includes the HNB's NATed Internet Protocol (IP) address and a User Datagram Protocol (UDP) port number; and to control establishment and management of an S15 session with a policy rules and charging function (PCRF) based on the tunnel information, wherein the HNB-GW initiates the establishment of the S15 session with the PCRF, and sends the HNB NATed IP address and the UDP port number when NAT/NAPT is detected.

3. A method, performed by a home base station (HNB), comprising:

receiving a local Internet Protocol (IP) address from a broadband access network;

signaling tunnel information to a home base station gateway (HNB-GW), the tunnel information being provided in a dedicated tunnel information element (IE) of an HNB register request message; and detecting Network Address Translation/Network Address and Port Translation (NAT/NAPT);

wherein, when NAT/NAPT is detected, the tunnel information IE of the HNB register request message includes the HNB's NATed IP address and a User Datagram Protocol (UDP) port number to support establishment and management, by the HNB-GW, of an S15 session with a policy rules and charging function (PCRF).

4. A method, performed by a home base station gateway (HNB-GW), the method comprising:

receiving, from a home base station (HNB), tunnel information, the tunnel information being provided in a dedicated tunnel information element (IE) of an HNB register request message, wherein, when Network Address Translation/Network Address and Port Translation (NAT/NAPT) is detected, the tunnel information IE of the HNB register request message includes the HNB's NATed Internet Protocol (IP) address and a User Datagram Protocol (UDP) port number; and establishing and managing an S15 session with a policy rules and charging function (PCRF) based on the tunnel information, wherein the establishment and managing of the S15 session with the PCRF comprises initiating establishment of the S15 session with the PCRF and sending the HNB NATed IP address and the UDP port number when NAT/NAPT is detected.

* * * * *

UNITED STATES PATENT AND TRADEMARK OFFICE
CERTIFICATE OF CORRECTION

PATENT NO. : 10,728,213 B2
APPLICATION NO. : 14/238452
DATED : July 28, 2020
INVENTOR(S) : Vivek Jha It is certified that error appears in the above-identified patent and that said Letters Patent is hereby corrected as shown below:

In the Specification

Column 4, Summary of Invention, Line 6; Delete "SLAP" and insert --S1AP-- therefor Column 9, Description of Embodiments, Line 32; Delete "BNB" and insert --HNB-- therefor Column 10, Description of Embodiments, Line 30; Delete "BNB-GW" and insert --HNB-GW-- therefor Column 10, Description of Embodiments, Line 47; Delete "BNB" and insert --HNB-- therefor Column 12, Description of Embodiments, Line 16; Delete "SLAP" and insert --S1AP-- therefor Column 24, Description of Embodiments, Line 43; Delete "BNB" and insert --HNB-- therefor Column 24, Description of Embodiments, Line 49; Delete "BNB" and insert --HNB-- therefor Signed and Sealed this
Eighth Day of December, 2020

Andrei Iancu
*Director of the United States Patent and Trademark Office*